US008170315B2

(12) United States Patent
Mistretta et al.

(10) Patent No.: US 8,170,315 B2
(45) Date of Patent: May 1, 2012

(54) LOCALIZED AND HIGHLY CONSTRAINED IMAGE RECONSTRUCTION METHOD

(75) Inventors: Charles A. Mistretta, Madison, WI (US); Julia Velikina, Madison, WI (US); Kevin Michael Johnson, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1083 days.

(21) Appl. No.: 12/032,240

(22) Filed: Feb. 15, 2008

(65) Prior Publication Data

US 2008/0219535 A1 Sep. 11, 2008

Related U.S. Application Data

(60) Provisional application No. 60/901,728, filed on Feb. 19, 2007.

(51) Int. Cl.
*G06K 9/00* (2006.01)
(52) U.S. Cl. ........................................ 382/131
(58) Field of Classification Search .......... 382/128, 382/131, 132; 324/307; 600/407, 410; 378/4, 378/901
See application file for complete search history.

(56) References Cited

U.S. PATENT DOCUMENTS

| | | | |
|---|---|---|---|
| 5,502,385 A | 3/1996 | Kuhn et al. | |
| 5,603,322 A | 2/1997 | Jesmanowicz et al. | |
| 5,604,778 A | 2/1997 | Polacin et al. | |
| 5,933,006 A | 8/1999 | Rasche et al. | |
| 6,490,472 B1 | 12/2002 | Li et al. | |
| 6,807,248 B2 | 10/2004 | Mihara et al. | |
| 6,954,067 B2 | 10/2005 | Mistretta | |
| 7,358,730 B2 | 4/2008 | Mistretta et al. | |
| 7,408,347 B2 | 8/2008 | Mistretta et al. | |
| 7,519,412 B2 | 4/2009 | Mistretta | |
| 7,545,901 B2 | 6/2009 | Mistretta | |
| 7,647,088 B2 | 1/2010 | Mistretta et al. | |
| 7,711,166 B2 | 5/2010 | Mistretta et al. | |
| 7,865,227 B2 | 1/2011 | Mistretta | |
| 2001/0027262 A1 | 10/2001 | Mistretta et al. | |
| 2007/0038073 A1 | 2/2007 | Mistretta | |
| 2007/0167728 A1 | 7/2007 | Mistretta et al. | |
| 2008/0199063 A1 | 8/2008 | O'Halloran et al. | |
| 2009/0076369 A1 | 3/2009 | Mistretta et al. | |
| 2009/0129651 A1 | 5/2009 | Zagzebski et al. | |

(Continued)

FOREIGN PATENT DOCUMENTS

EP 0627633 A1 7/1994

(Continued)

OTHER PUBLICATIONS

Wieslaw L. Nowinski, The Iterated Normalized Backprojection Method of Image Reconstruction, Institute of Computer Science, Polish Academy of Sciences Ordona 21, 01-237 Warsaw, Poland.

(Continued)

*Primary Examiner* — Jurie Yun
(74) *Attorney, Agent, or Firm* — Quarles & Brady LLP

(57) ABSTRACT

An image reconstruction method includes reconstructing a composite image of a subject using a conventional reconstruction method. The composite image employs the best information available regarding the subject of the scan and this information is used to constrain the reconstruction of a highly undersampled image frames or improve the SNR of image frames. A blurred and normalized weighting image is produced from image frame data, and this normalized weighting image is multiplied by the composite image.

16 Claims, 19 Drawing Sheets

U.S. PATENT DOCUMENTS

2010/0286504 A1    11/2010    Mistretta et al.

FOREIGN PATENT DOCUMENTS

| WO | W02005026765 A1 | 3/2005 |
|---|---|---|
| WO | W02005069031 A1 | 7/2005 |

OTHER PUBLICATIONS

Y. Huang et al, Time-Resolved 3D MR Angiography by Interleaved Biplane Projections, Proc. Intl. Soc. Mag. Reson. Med. 13 p. 1707 (2005).

T.A. Cashen et al, Comparison of Temporal and Spatial Undersampling Techniques for Time-Resolved Contrast-Enhanced MR Angiography, Proc. Intl. Soc. Mag. Reson. Med. 13, p. 380 (2005).

Graeme C. McKinnon et al, Towards Imaging the Beating Heart Usefully with a Conventional CT Scanner, IEEE Trans. on Biomedical Eng., vol. BME-28, No. 2, p. 123-127, Feb. 1981.

Kathryn L. Garden et al, 3-D Reconstruction of the Heart from few Projections: A Practical Implementation of the McKinnon-Bates Algorithm, IEEE Trans. on Biomedical Eng., vol. MI-5, No. 4, p. 233-234, Dec. 1986.

C.A. Mistretta et al, Highly Constrained Backprojection for Time-Resolved MRI, Mag. Reson. Med. 55:30-40 (2006).

Zhi-Pei Liang et al, Constrained Reconstruction Methods in MR Imaging, Reviews of Mag. Reson. in Med. vol. 4, pp. 67-185, 1992.

J.G. Pipe et al, Spiral Projection Imaging: a new fast 3D trajectory, Proc. Intl. Soc. Mag. Reson. Med. 13, p. 2402 (2005).

K.V. Koladia et al, Rapid 3D PC-MRA using Spiral Projection Imaging, Proc. Intl. Soc. Mag. Reson. Med. 13, p. 2403 (2005).

J. Tsao et al, k-t BLAST and k-t SENSE: Dynamic MRI With High Frame Rate Exploiting Spatiotemporal Correlations. Mag. Reson. Med. 50:1031-1042 (2003).

Zhi-Pei Liang et al, Constrained Imaging-Overcoming the Limitations of the Fourier Series, IEEE Engineering in Medicine and Biology, Sep./Oct. 1996, pp. 126-132.

Zhi-Pei Liang et al, Fast Algorithms for GS-Model-Based Image Reconstruction in Data-Sharing Fourier Imaging, IEEE Transactions on Med. Imaging, vol. 22, No. 8, pp. 1026-1030, Aug. 2003.

Klass P. Pruessmann et al, Advances in Sensitivity Encoding With Arbitrary k-Space Trajectories, Mag. Reson. in Med. 46:638-651 (2001).

R. Fahrig et al, Use of a C-Arm System to Generate True Three-dimensional Computed Rotational Angiograms: Preliminary In Vitro and In Vivo Results, AJNR: 18, pp. 1507-1514,Sep. 1997.

A.V. Barger, et al, Single Breath-Hold 3D Contrast-Enhanced Method for Assessment of Cardiac Function, Mag. Reson, in Med. 44:821-824 (2000).

J. Du et al, Time-Resolved Undersampled Projection Reconstruction Imaging for High-Resolution CE-MRA of the Distal Runoff Vessels, Mag. Reson. in Med. 48:516-522 (2002).

Ashwani Aggarwal et al, Imaging in Turbid Media by Modified Filtered Back Projection Method Using Data From Monte Carlo Simulation, Proc. of SPIE vol. 5047, pp. 314-324 (2003).

Xavier Golay, et al, Presto-Sense: An Ultrafast Whole-Brain fMRI Technique, Mag. Reson. in Med. 43:779-786 (2000).

Ronald R. Price, et al, Practical Aspects of Functional MRI (NMR Task Group #8), Medical Physics, vol. 29, No. 8, pp. 1892-1912, Aug. 2002.

M.S. Hansen et al, k-t Blast Reconstruction From Arbitrary k-t space Sampling: Application to Dynamic Radial Imaging, Proc. Intl. Soc. Mag. Reson. Med. (2003).

P. Schmidlin et al; Subsets and Overrelaxation in Iterative Image Reconstruction; Phys. Med. Biol. 44 (1999) 1385-1396.

C. Badea et al; Experiments With the Nonlinear and Chaotic Behavior of the Multiplicative Algebraic Reconstruction Technique (MART) Algorithm for Computed Tomography; Phys. Med. Biol. 49 (2004) 1455-1474.

R. Boubertakh et al., Dynamic Images Reconstruction using kt-Blast without Training Data, Proc. Intl. Soc. Med. 11 p. 343 (2004).

P. Irarrazaval et al., Reconstruction of Undersampled Dynamic Images Based on Time Frame Registration, Proc. Intl. Soc. Med. 11 p. 342 (2004).

J. Tsao et al., Optimized canonical sampling patterns in k-t space with two and three spatial dimensions for k-t BLAST and k-t Proc. Intl. Soc. Med. 11 p. 261 (2004).

M. S. Hansen et al., A study of the spatial-temporal tradeoff in k-t BLAST reconstruction, Proc. Intl. Soc. Med. 11 p. 536 (2004).

J. Tsao et al., Moving-buffer k-t BLAST for real-time reconstruction: Cartesian & simplified radial cases, Proc. Intl. Soc. Med. 11 p. 635 (2004).

F. Huang et al., Reconstruction with Prior Information for Dynamic MRI, Proc. Intl. Soc. Med. 11 p. 2680 (2004).

D. Mitsouras et al., Accelerated MR Imaging via FOLDing the non-Fourier Encoded Dimensions, Proc. Intl. Soc. Med. 11 p. 2092 (2004).

P. C. Lauterbur and Z. Liang, et al., Magnetic Resonance Imaging with a priori Constraints: Possibilities and Limitations, IEEE Engineering in Medicine and Biology Society, 1996.

C. Baltes et al., Considerations on training data in k-t BLAST / k-t SENSE accelerated quantitative flow measurements. Proc. Intl. Soc. Mag. Reson. Med. 13 p. 383 (2005).

M. S. Hansen et al., On the Influence of Training Data Quality in k-t BLAST Reconstruction, Mag. Reson. Med. 52:1175-1183 (2004).

M. Lustig et al., k-t SPARSE: High Frame Rate Dynamic MRI Exploiting Spatio-Temporal Sparsity, Proc. Intl. Soc. Mag. Reson. Med 14 (2006).

J. Tsao et al., Unifying Linear Prior-Information-Driven Methods for Accelerated Image Acquisition, Mag. Reson. Med. 46:652-660 (2001).

Q. Xiang and R.M. Henkelman, K-Space Description for MR Imaging of Dynamic Objects, Mag. Reson. Med. 29:422-428 (1993).

M. Lustig et al., Rapid MR Imaging with Compressed Sensing and Randomly Under-Sampled 3DFT Trajectories, Proc. Intl. Soc. Mag. Reson. Med. 14 (2006).

S. Krishnan and T. L. Chenevert, Spatio-Temporal Bandwidth-Based Acquisition for Dynamic Contrast-Enhanced Magnetic Resonance Imaging, J. Mag. Reson. Imaging 20:129-137 (2004).

M. S. Hansen et al., k-t BLAST Reconstruction From Non-Cartesian k-t Space Sampling, Mag. Reson. Med. 55:85-91 (2006).

A. G. Webb et al., Application of Reduced-Encoding MR Imaging with Generalized-Series Reconstruction (RIGR), J. Mag. Reson. Imaging 3:925-928 (1993).

B. Madore and M. J. Pelc, New Approach to 3D Time-Resolved Angiography, Mag. Reson. Med. 47:1022-1025 (2002).

J. Tsao et al., Optimizing Spatiotemporal Sampling for k-t BLAST and k-t SENSE: Application to High-Resolution Real-Time Cardiac Steady-State Free Precession, Mag. Reson. Med. 53:1372-1382 (2005).

Wisconsin Alumni Research Foundation HYPE Portfolio Flow Chart; 3 pages; Jan. 19, 2011.

Wu et al; HYPR-Trick: Highly Undersampled Hybrid Radial/Cartesian Acquisition with Highly Constrained Backprojection Reconstruction For Time Resolved MRI; Proc. Intl. Soc. Mag. Reson. Med. 14 (2006); 1 page.

Supanich et al; Dose Reduction in Neuro CT Exams Using Highly Constrained Back Projection (HYPR) Techniques; hppt://rsna2006.rsna.org; Nov. 30, 2006; 2 pages.

Mistretta, C.A.; Prospects for Acceleration and Dose Reduction in Selected MR and X-Ray CT Cardiovascular Applications; Proc. Intl. Soc. Mag. Reson. Med. 14 (2006); 1 page.

Wisconsin Alumni Research Foundation HYPE Portfolio Flow Chart; 3 pages; Nov. 17, 2011.

US 8,170,315 B2

LOCALIZED AND HIGHLY CONSTRAINED IMAGE RECONSTRUCTION METHOD

CROSS-REFERENCE TO RELATED APPLICATIONS

This application is based on U.S. Provisional Patent Application Ser. No. 60/901,728 filed on Feb. 19, 2007 and entitled "LOCALIZED AND HIGHLY CONSTRAINED IMAGE RECONSTRUCTION METHOD."

STATEMENT REGARDING FEDERALLY SPONSORED RESEARCH

This invention was made with government support under Grant No. HL72260 awarded by the National Institute of Health. The United States Government has certain rights in this invention.

BACKGROUND OF THE INVENTION

The field of the invention is medical imaging and particularly, methods for reconstructing images from acquired image data.

Magnetic resonance imaging (MRI) uses the nuclear magnetic resonance (NMR) phenomenon to produce images. When a substance such as human tissue is subjected to a uniform magnetic field (polarizing field $B_0$), the individual magnetic moments of the spins in the tissue attempt to align with this polarizing field, but process about it in random order at their characteristic Larmor frequency. If the substance, or tissue, is subjected to a magnetic field (excitation field $B_1$) which is in the x-y plane and which is near the Larmor frequency, the net aligned moment, $M_Z$, may be rotated, or "tipped", into the x-y plane to produce a net transverse magnetic moment $M_t$. A signal is emitted by the excited spins, and after the excitation signal $B_1$ is terminated, this signal may be received and processed to form an image.

When utilizing these signals to produce images, magnetic field gradients ($G_X$, $G_Y$ and $G_Z$) are employed. Typically, the region to be imaged is scanned by a sequence of measurement cycles in which these gradients vary according to the particular localization method being used. Each measurement is referred to in the art as a "view" and the number of views determines the quality of the image. The resulting set of received NMR signals, or views, or k-space samples, are digitized and processed to reconstruct the image using one of many well known reconstruction techniques. The total scan time is determined in part by the length of each measurement cycle, or "pulse sequence", and in part by the number of measurement cycles, or views, that are acquired for an image. There are many clinical applications where total scan time for an image of prescribed resolution and SNR is a premium, and as a result, many improvements have been made with this objective in mind.

Projection reconstruction methods have been known since the inception of magnetic resonance imaging and this method is again being used as disclosed in U.S. Pat. No. 6,487,435. Rather than sampling k-space in a rectilinear, or Cartesian, scan pattern as is done in Fourier imaging and shown in FIG. 2A, projection reconstruction methods sample k-space with a series of views that sample radial lines extending outward from the center of k-space as shown in FIG. 2B. The number of views needed to sample k-space determines the length of the scan and if an insufficient number of views are acquired, streak artifacts are produced in the reconstructed image. The technique disclosed in U.S. Pat. No. 6,487,435 reduces such streaking by acquiring successive undersampled images with interleaved views and sharing peripheral k-space data between successive image frames.

In a computed tomography ("CT") system, an x-ray source projects a fan-shaped beam which is collimated to lie within an X-Y plane of a Cartesian coordinate system, termed the "image plane." The x-ray beam passes through the object being imaged, such as a medical patient, and impinges upon an array of radiation detectors. The intensity of the transmitted radiation is dependent upon the attenuation of the x-ray beam by the object and each detector produces a separate electrical signal that is a measurement of the beam attenuation. The attenuation measurements from all the detectors are acquired separately to produce what is called the "transmission profile".

The source and detector array in a conventional CT system are rotated on a gantry within the imaging plane and around the object so that the angle at which the x-ray beam intersects the object constantly changes. The transmission profile from the detector array at a given angle is referred to as a "view" and a "scan" of the object comprises a set of views made at different angular orientations during one revolution of the x-ray source and detector. In a 2D scan, data is processed to construct an image that corresponds to a two dimensional slice taken through the object.

As with MRI, there are a number of clinical applications for x-ray CT where scan time is at a premium. In time-resolved angiography, for example, a series of image frames are acquired as contrast agent flows into the region of interest. Each image is acquired as rapidly as possible to obtain a snapshot that depicts the inflow of contrast. This clinical application is particularly challenging when imaging coronary arteries or other vessels that require cardiac gating to suppress motion artifacts.

There are two methods used to reconstruct images from an acquired set of projection views as described, for example, in U.S. Pat. No. 6,710,686. In MRI the most common method is to regrid the k-space samples from their locations on the radial sampling trajectories to a Cartesian grid. The image is then reconstructed by performing a 2D or 3D Fourier transformation of the regridded k-space samples. The second method for reconstructing an MR image is to transform the radial k-space projection views to Radon space by first Fourier transforming each projection view. An image is reconstructed from these signal projections by filtering and back-projecting them into the field of view (FOV). As is well known in the art, if the acquired signal projections are insufficient in number to satisfy the Nyquist sampling theorem, streak artifacts are produced in the reconstructed image.

The prevailing method for reconstructing an image from 2D x-ray CT data is referred to in the art as the filtered backprojection technique. This backprojection process is essentially the same as that used in MR image reconstruction discussed above and it converts the attenuation signal measurements acquired in the scan into integers called "CT numbers" or "Hounsfield units", which are used to control the brightness of a corresponding pixel on a display.

The standard backprojection method used in both the MRI and x-ray CT is graphically illustrated in FIG. 3. Each acquired signal projection profile 10 is backprojected onto the field of view 12 by projecting each signal sample 14 in the profile 10 through the FOV 12 along the projection path as indicted by arrows 16. In backprojecting each signal sample 14 into the FOV 12 no a priori knowledge of the subject being imaged is used and the assumption is made that the signals in the FOV 12 are homogeneous and that the signal sample 14 should be distributed equally in each pixel through which the projection path passes. For example, a projection path 8 is illustrated in FIG. 3 for a single signal sample 14 in one signal projection profile 10 as it passes through N pixels in the FOV 12. The signal value (P) of this signal sample 14 is divided up equally between these N pixels:

$$S_n = (P \times 1)/N \qquad (1)$$

where: $S_n$ is the signal value distributed to the $n^{th}$ pixel in a projection path having N pixels.

Clearly, the assumption that the backprojected signal in the FOV 12 is homogeneous is not correct. However, as is well known in the art, if certain corrections are made to each signal profile 10 and a sufficient number of profiles are acquired at a corresponding number of projection angles, the errors caused by this faulty assumption are minimized and image artifacts are suppressed. In a typical, filtered backprojection method of image reconstruction, 400 projections are required for a 256× 256 pixel 2D image and 203,000 projections are required for a 256×256×256 voxel 3D image.

Recently a new image reconstruction method known in the art as "HYPR" and described in co-pending U.S. patent application Ser. No. 11/482,372, filed on Jul. 7, 2006 and entitled "Highly Constrained Image Reconstruction Method" was disclosed and is incorporated by reference into this application. With the HYPR method a composite image is reconstructed from acquired data to provide a priori knowledge of the subject being imaged. This composite image is then used to highly constrain the image reconstruction process. HYPR may be used in a number of different imaging modalities including magnetic resonance imaging (MRI), x-ray computed tomography (CT), positron emission tomography (PET), single photon emission computed tomography (SPECT) and digital tomosynthesis (DTS).

As shown in FIG. 1, for example, when a series of time-resolved images 2 are acquired in a dynamic study, each image frame 2 may be reconstructed using a very limited set of acquired views. However, each such set of views is interleaved with the views acquired for other image frames 2, and after a number of image frames have been acquired, a sufficient number of different views are available to reconstruct a quality composite image 3 for use according to the HYPR method. A composite image 3 formed by using all the interleaved projections is thus much higher quality, and this higher quality is conveyed to the image frame by using the highly constrained image reconstruction method 4. The image frames 2 may also be acquired in a dynamic study in which the dosage (e.g., x-ray) or exposure time (e.g., PET or SPECT) is reduced for each image frame. In this case the composite image is formed by accumulating or averaging measurements from the series of acquired image frames. The highly constrained reconstruction 4 of each image frame 2 conveys the higher SNR of this composite image to the resulting reconstructed image.

A discovery of the HYPR method is that good quality images can be produced with far fewer projection signal profiles if a priori knowledge of the signal contour in the FOV 12 is used in the reconstruction process. Referring to FIG. 4, for example, the signal contour in the FOV 12 may be known to include structures such as blood vessels 18 and 20. That being the case, when the backprojection path 8 passes through these structures a more accurate distribution of the signal sample 14 in each pixel is achieved by weighting the distribution as a function of the known signal contour at that pixel location. As a result, a majority of the signal sample 14 will be distributed in the example of FIG. 4 at the backprojection pixels that intersect the structures 18 and 20. For a back-projection path 8 having N pixels this highly constrained backprojection may be expressed as follows:

$$S_n = (P \times C_n) \Big/ \sum_{n=1}^{N} C_n \qquad (2)$$

where: $S_n$=the backprojected signal magnitude at a pixel n in an image frame being reconstructed;

P=the signal sample value in the projection profile being backprojected; and $C_n$=signal value of an a priori composite image at the $n^{th}$ pixel along the backprojection path. The composite image is reconstructed from data acquired during the scan, and may include that used to reconstruct the image frame as well as other acquired image data that depicts the structure in the field of view.

The numerator in equation (2) weights each pixel using the corresponding signal value in the composite image and the denominator normalizes the value so that all backprojected signal samples reflect the projection sums for the image frame and are not multiplied by the sum of the composite image.

While the normalization can be performed on each pixel separately after the backprojection, in many clinical applications it is far easier to normalize the projection P before the backprojection. In this case, the projection P is normalized by dividing by the corresponding value $P_c$ in a projection through the composite image at the same view angle. The normalized projection $P/P_c$ is then backprojected and the resulting image is then multiplied by the composite image.

A 3D embodiment of the highly constrained backprojection is shown pictorially in FIG. 5 for a single 3D projection view characterized by the view angles θ and φ. This projection view is back projected along axis 16 and spread into a Radon plane 21 at a distance r along the back projection axis 16. Instead of a filtered back projection in which projection signal values are filtered and uniformly distributed into the successive Radon planes, along axis 16, the projection signal values are distributed in the Radon plane 21 using the information in the composite image. The composite image in the example of FIG. 5 contains vessels 18 and 20. The weighted signal contour value is deposited at image location x, y, z in the Radon plane 21 based on the intensity at the corresponding location x, y, z in the composite image. This is a simple multiplication of the backprojected signal profile value P by the corresponding composite image voxel value. This product is then normalized by dividing the product by the projection profile value from the corresponding image space projection profile formed from the composite image. The formula for the 3D reconstruction is $$I(x,y,z) = \Sigma(P(r,\theta,\phi) * C(x,y,z)_{(r,\theta,\phi)} / P_c(r,\theta,\phi)) \qquad (2a)$$

where the sum (Σ) is over all projections in the image frame being reconstructed and the x, y, z values in a particular Radon plane are calculated using the projection profile value P(r,θ,φ) at the appropriate r,θ,φ value for that plane. $P_c(r,\theta,\phi)$ is the corresponding projection profile value from the composite image, and $C(x,y,z)_{r,\theta,\phi}$ is the composite image value at (r,θ, φ).

The HYPR method works well under certain circumstances. First, HYPR works best with "sparse" data sets in which the subject of interest in the field of view occupies a small fraction of the image space. In the limit of extremely sparse images or images with complete spatio-temporal correlation the HYPR reconstruction method provides nearly exact reconstruction. As the sparsity and spatio-temporal correlation deteriorate the accuracy of the HYPR reconstruction decreases and local signals can be altered due to the influence of signals elsewhere in the field of view that have different temporal behavior.

SUMMARY OF THE INVENTION

The present invention is a new method for producing medical images, and particularly, an improved method for producing an image using the HYPR reconstruction method. An initial frame derived from limited data is used to produce a normalized weighting image that is multiplied by a high quality composite image to produce a higher quality image frame. The normalized weighting image is produced by blurring the initial image frame with a filter and dividing the blurred image frame with a similarly blurred version of the composite image. Where the initial image frame is limited due to undersampling, the version of the composite image used to produce the normalized weighting image is "limited" to the same undersampled views embodied in the initial image frame.

A general object of the invention is to improve the quality of an image frame produced with limited data. The data may be limited in the sense that an image frame having a low signal-to-noise ratio ("SNR") is produced and/or it is limited in the sense that it is produced from views that undersample acquisition space (e.g., k-space or Radon space). In either case the higher quality of the composite image is imbued in the image frame by the present invention.

Another general object of the invention is to improve the performance of the HYPR reconstruction method when non-sparse data sets are acquired. To reduce the influence of distant signals in the field of view (FOV) of an image being reconstructed with the HYPR method, the field of view can be divided into smaller segments which are separately reconstructed. Only those portions of the projection views that forward project through the smaller segment being reconstructed are used in the HYPR reconstruction of that segment. The reconstructed smaller image segments are then combined to provide a reconstructed image of the entire FOV. This is shown pictorially in FIG. 19 where projections P1, P2 ... $P_n$ are backprojected over a limited segment S(x,y) of the entire FOV 5. As the size of each segment S(x,y) decreases and the number of segments increases, this "localized" HYPR reconstruction can be viewed as segmentation into small regions surrounding each image pixel I(x,y). The value for the intensity I(x,y) is obtained by summing all the backprojected values $P1_{lim}$ through $Pn_{lim}$ within the segment S(x,y):

$$I(x,y)=\text{sum}(P1_{lim}-Pn_{lim})=\text{sum}(\text{nearest neighbors})=I(x,y)\times\text{local kernel}.$$

The intensity at each pixel I(x,y) becomes the sum of the nearest neighbors of pixel x,y, which is a convolution of I(x,y) with a uniform limited kernel. This is equivalent to a low pass filtered version of the reconstructed image frame. More specifically, a low pass filtered version of the image frame is normalized by dividing it by a low pass filtered version of the composite image and the resulting normalized weighting image is then multiplied by the full resolution composite image. The low pass filtering operations can be performed in Radon space or k-space, or they can be performed in image space. This localized HYPR reconstruction uses signals within a local volume, or segment, surrounding each pixel and cross-talk from signals produced elsewhere in the field of view is eliminated.

Another object of the invention is to avoid the need for Radon transformations or back projection operations. The localized HYPR reconstruction can be carried out with a series of low pass filtering operations, a division operation and a multiplication operation. These operations can be carried out in acquisition space (e.g., Radon space or k-space) or image space.

Yet another object of the invention is to provide a HYPR reconstruction method that can be used with data acquired by many different imaging modalities and with many different sampling patterns. The method can be used to reconstruct images from data acquired by an MRI system, an x-ray CT system, a PET scanner or a SPECT scanner. When used in an MRI system the k-space data can be acquired using any sampling trajectory. The method can also be used to enhance radiographic images.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE PREFERRED EMBODIMENT

The present invention may be applied to many different medical imaging modalities and to many different clinical applications. While the preferred embodiment described below employs an MRI system that acquires projection views of the subject being imaged, other imaging modalities may also employ this invention and sampling trajectories other than radial projection views may be acquired.

Figure 6:
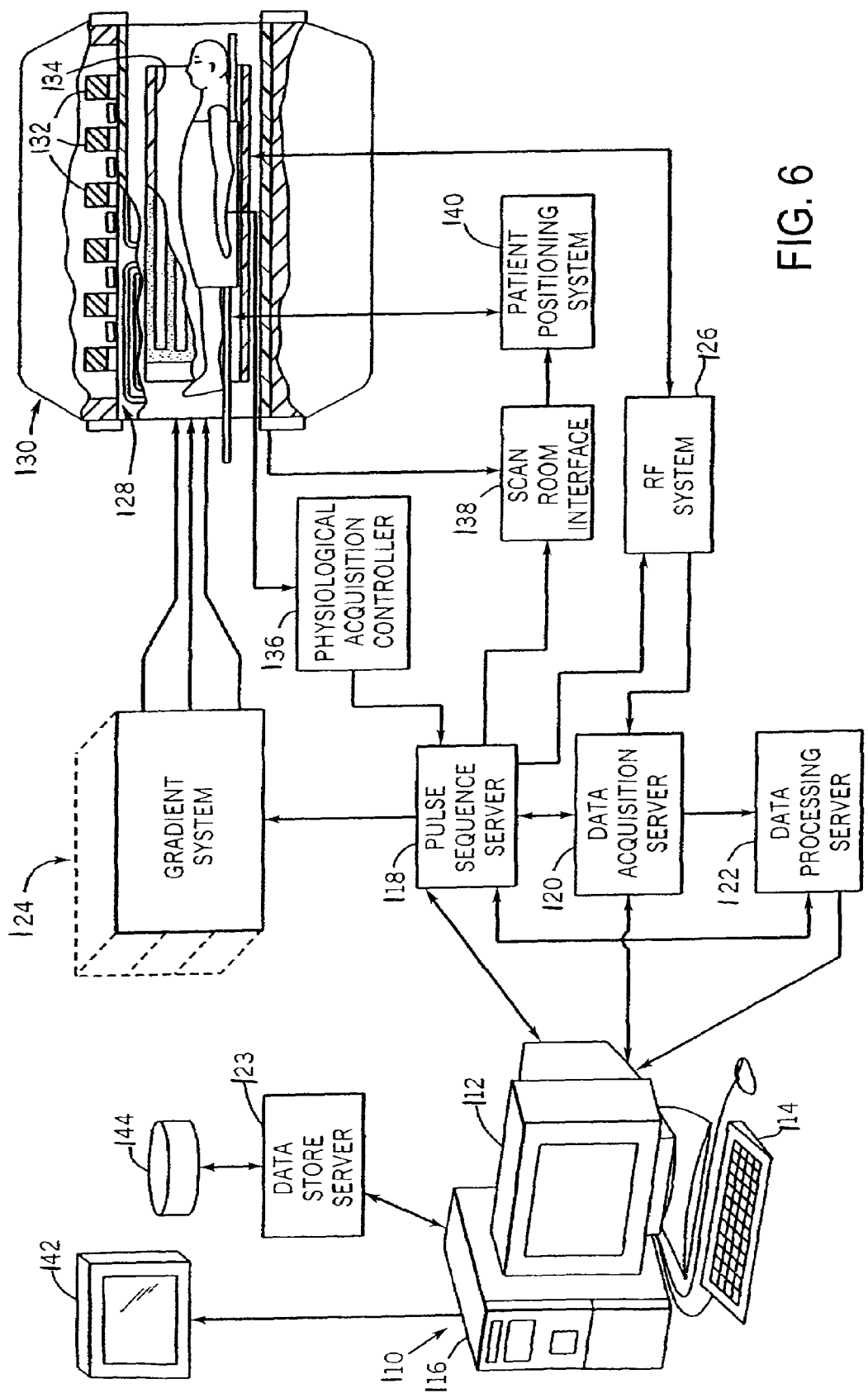
FIG. 6 is a block diagram of a magnetic resonance imaging (MRI) system used to practice the present invention.

Referring particularly to FIG. 6, a preferred embodiment of the invention is employed in an MRI system. The MRI system includes a workstation 110 having a display 112 and a keyboard 114. The workstation 110 includes a processor 116 which is a commercially available programmable machine running a commercially available operating system. The workstation 110 provides the operator interface which enables scan prescriptions to be entered into the MRI system.

The workstation 110 is coupled to four servers: a pulse sequence server 118; a data acquisition server 120; a data processing server 122, and a data store server 23. In the preferred embodiment the data store server 123 is performed by the workstation processor 116 and associated disc drive interface circuitry. The remaining three servers 118, 120 and 122 are performed by separate processors mounted in a single enclosure and interconnected using a 64-bit backplane bus. The pulse sequence server 118 employs a commercially available microprocessor and a commercially available quad communication controller. The data acquisition server 120 and data processing server 122 both employ the same commercially available microprocessor and the data processing server 122 further includes one or more array processors based on commercially available parallel vector processors.

The workstation 110 and each processor for the servers 18, 20 and 22 are connected to a serial communications network. This serial network conveys data that is downloaded to the servers 118, 120 and 122 from the workstation 110 and it conveys tag data that is communicated between the servers and between the workstation and the servers. In addition, a high speed data link is provided between the data processing server 122 and the workstation 110 in order to convey image data to the data store server 123.

The pulse sequence server 118 functions in response to program elements downloaded from the workstation 110 to operate a gradient system 124 and an RF system 126. Gradient waveforms necessary to perform the prescribed scan are produced and applied to the gradient system 124 which excites gradient coils in an assembly 128 to produce the magnetic field gradients $G_X$, $G_Y$ and $G_Z$ used for position encoding NMR signals. The gradient coil assembly 128 forms part of a magnet assembly 130 which includes a polarizing magnet 132 and a whole-body RF coil 134.

RF excitation waveforms are applied to the RF coil 134 by the RF system 126 to perform the prescribed magnetic resonance pulse sequence. Responsive NMR signals detected by the RF coil 134 are received by the RF system 126, amplified, demodulated, filtered and digitized under direction of commands produced by the pulse sequence server 118. The RF system 126 includes an RF transmitter for producing a wide variety of RF pulses used in MR pulse sequences. The RF transmitter is responsive to the scan prescription and direction from the pulse sequence server 118 to produce RF pulses of the desired frequency, phase and pulse amplitude waveform. The generated RF pulses may be applied to the whole body RF coil 134 or to one or more local coils or coil arrays.

The RF system 126 also includes one or more RF receiver channels. Each RF receiver channel includes an RF amplifier that amplifies the NMR signal received by the coil to which it is connected and a quadrature detector which detects and digitizes the I and Q quadrature components of the received NMR signal. The magnitude of the received NMR signal may thus be determined at any sampled point by the square root of the sum of the squares of the I and Q components:

$$M=\sqrt{I^2+Q^2}$$

and the phase of the received NMR signal may also be determined:

$$\phi=\tan^{-1}Q/I.$$

The pulse sequence server 118 also optionally receives patient data from a physiological acquisition controller 136. The controller 136 receives signals from a number of different sensors connected to the patient, such as ECG signals from electrodes or respiratory signals from a bellows. Such signals are typically used by the pulse sequence server 118 to synchronize, or "gate", the performance of the scan with the subject's respiration or heart beat.

The pulse sequence server 118 also connects to a scan room interface circuit 138 which receives signals from various sensors associated with the condition of the patient and the magnet system. It is also through the scan room interface circuit 138 that a patient positioning system 140 receives commands to move the patient to desired positions during the scan.

It should be apparent that the pulse sequence server 118 performs real-time control of MRI system elements during a scan. As a result, it is necessary that its hardware elements be operated with program instructions that are executed in a timely manner by run-time programs. The description components for a scan prescription are downloaded from the workstation 110 in the form of objects. The pulse sequence server 118 contains programs which receive these objects and converts them to objects that are employed by the run-time programs.

The digitized NMR signal samples produced by the RF system 126 are received by the data acquisition server 120. The data acquisition server 120 operates in response to description components downloaded from the workstation 110 to receive the real-time NMR data and provide buffer storage such that no data is lost by data overrun. In some scans the data acquisition server 120 does little more than pass the acquired NMR data to the data processor server 122. However, in scans which require information derived from acquired NMR data to control the further performance of the scan, the data acquisition server 120 is programmed to produce such information and convey it to the pulse sequence server 118. For example, during prescans NMR data is acquired and used to calibrate the pulse sequence performed by the pulse sequence server 118. Also, navigator signals may be acquired during a scan and used to adjust RF or gradient system operating parameters or to control the view order in which k-space is sampled. And, the data acquisition server 120 may be employed to process NMR signals used to detect the arrival of contrast agent in an MRA scan. In all these examples the data acquisition server 120 acquires NMR data and processes it in real-time to produce information which is used to control the scan.

The data processing server 122 receives NMR data from the data acquisition server 120 and processes it in accordance with description components downloaded from the workstation 110. Such processing may include, for example: Fourier transformation of raw k-space NMR data to produce two or three-dimensional images; the application of filters to a reconstructed image; the performance of a backprojection image reconstruction of acquired NMR data; the calculation of functional MR images; the calculation of motion or flow images, etc. As will be described in more detail below, the present invention is implemented by the MRI system in response to a program executed by the data processing server 122.

Images reconstructed by the data processing server 122 are conveyed back to the workstation 110 where they are stored. Real-time images are stored in a data base memory cache (not shown) from which they may be output to operator display 112 or a display 142 which is located near the magnet assembly 130 for use by attending physicians. Batch mode images or selected real time images are stored in a host database on disc storage 144. When such images have been reconstructed and transferred to storage, the data processing server 122 notifies the data store server 123 on the workstation 110. The workstation 110 may be used by an operator to archive the images, produce films, or send the images via a network to other facilities.

Figure 7:
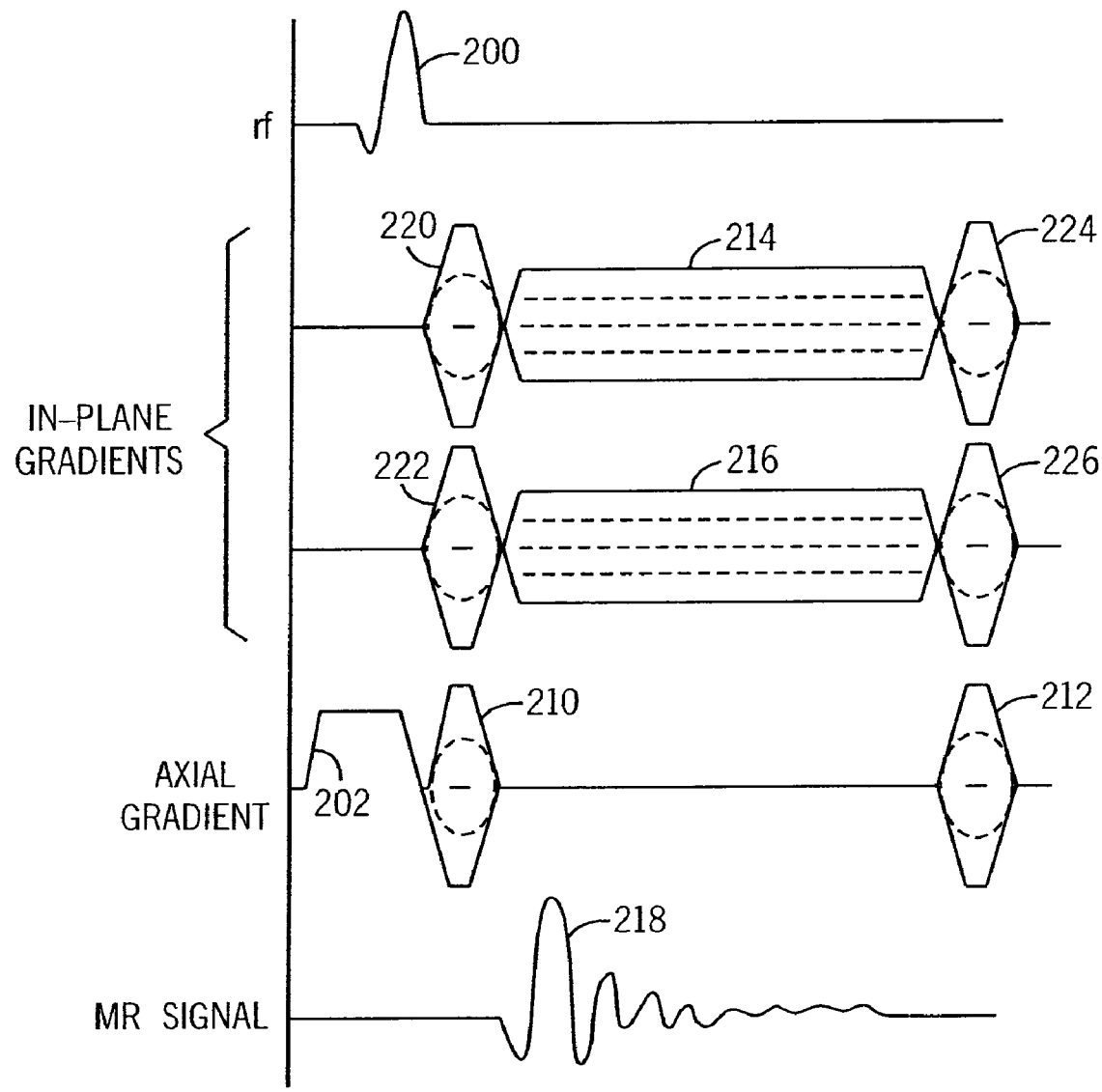
FIG. 7 is a pulse sequence used in the MRI system of FIG. 6 to practice one embodiment of the invention.
Figure 8:
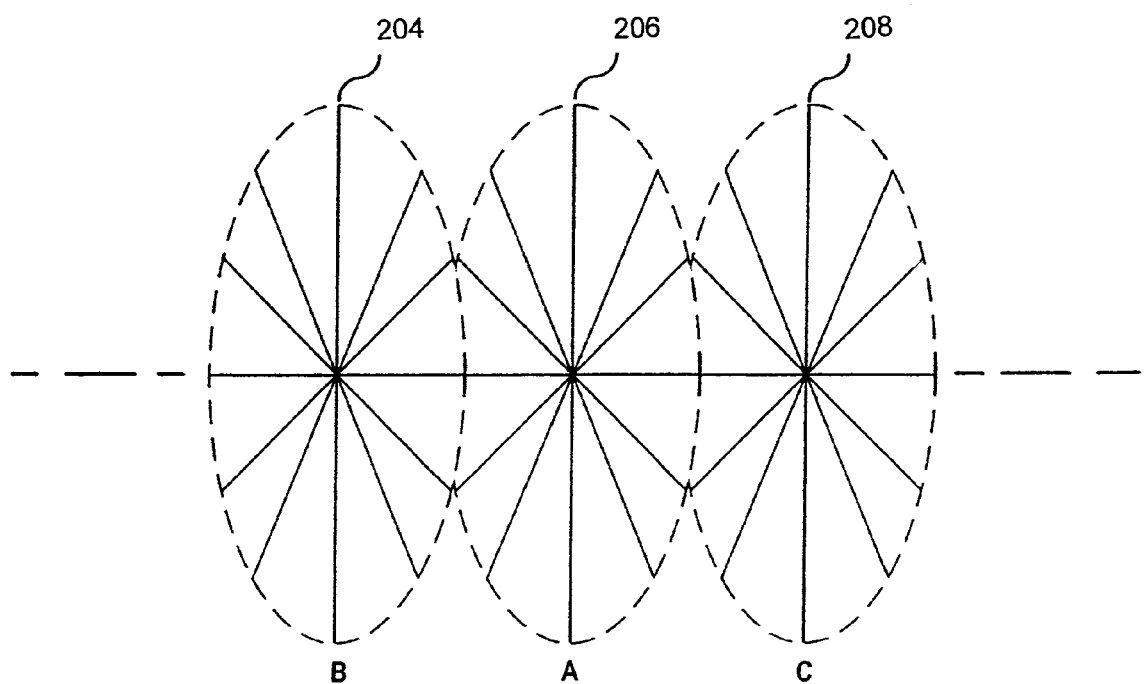
FIG. 8 is a pictorial representation of the k-space data sampled using the pulse sequence of FIG. 7.

To practice the preferred embodiment of the invention NMR data is acquired using a projection reconstruction, or radial, pulse sequence such as that shown in FIG. 7. This is a fast gradient-recalled echo pulse sequence in which a selective, asymmetrically truncated sinc rf excitation pulse 200 is produced in the presence of a slice-select gradient 202. This pulse sequence may be used to acquire a single 2D slice by sampling in a single k-space circular plane, or it may be used to sample a plurality of circular k-space planes as shown at 204, 206 and 208 in FIG. 8. When multiple 2D slices are acquired the gradient 202 is a slab select gradient followed by a phase encoding gradient lobe 210 and a rewinder gradient lobe 212 of opposite polarity. This axial, phase encoding gradient 210 is stepped through values during the scan to sample from each of the 2D k-space planes 204, 206 and 208.

Two in-plane readout gradients 214 and 216 are played out during the acquisition of an NMR echo signal 218 to sample k-space in a 2D plane 204, 206 or 208 along a radial trajectory. These in-plane gradients 214 and 216 are perpendicular to the axial gradient and they are perpendicular to each other. During a scan they are stepped through a series of values to rotate the view angle of the radial sampling trajectory as will be described in more detail below. Each of the in-plane readout gradients is preceded by a prephasing gradient lobe 220 and 222 and followed by a rewinder gradient lobe 224 and 226.

Figure 12:
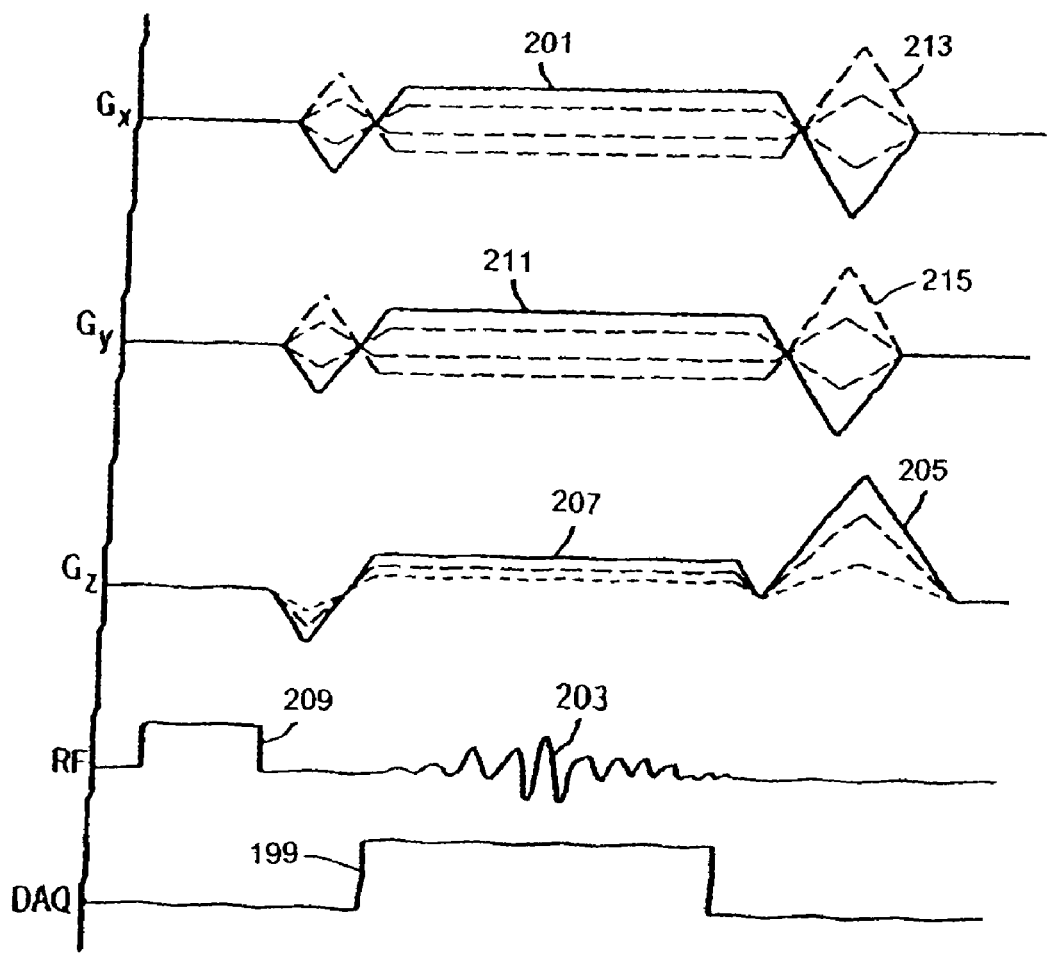
FIG. 12 is a pulse sequence used in the MRI system of FIG. 6 to practice another embodiment of the invention.

To practice another preferred embodiment of the invention a pulse sequence is used which acquires data as 3D radial projections as shown in FIG. 12. The sequence is implemented on the above described MRI system equipped with a high-performance gradient subsystem (40 mT/m maximum amplitude and 150 T/m/sec maximum slew rate). Either full-echo or partial-echo readouts can be performed during a data acquisition window 199. If partial echo is chosen, the bottom half of k-space ($k_z < 0$) is only partially acquired. Because of the large FOV in all directions, a non-selective radio-frequency (RF) pulse 209 can be used to produce transverse magnetization throughout the image FOV.

A gradient-recalled NMR echo signal 203 is produced by spins in the excited FOV and acquired in the presence of three readout gradients 201, 211 and 207. Since a slab-select gradient is not required, the readout gradient waveforms $G_x$, $G_y$ and $G_z$ have a similar form. This symmetry is interrupted only by the need to spoil the sequence, which is accomplished by playing a dephasing gradient lobe 205. The $G_x$, $G_y$ and $G_z$ readout gradients 201 and 211 are rewound by respective gradient pulses 213 and 215 to achieve steady state.

The readout gradient waveforms $G_x$, $G_y$ and $G_z$ are modulated during the scan to sample radial trajectories at different angles. The angular spacing is chosen such that a uniform distribution of k-space sample points occurs at the peripheral boundary ($k_{max}$) of the sampled k-space sphere. Although several methods of calculating the distribution are known, a method which evenly distributes the projections by sampling the spherical surface with a spiral trajectory, with the conditions of constant path velocity and surface area coverage is used. This solution also has the benefit of generating a continuous sample path, which reduces gradient switching and eddy currents. For N total projections, the equations for the gradient amplitude as a function of projection number n are:

$$G_z = \frac{2n-1}{2N} \tag{5}$$

$$G_x = \cos(\sqrt{2N\pi}\sin^{-1}G_z(n))\sqrt{1 - G_z(n)^2} \tag{6}$$

$$G_y = \cos(\sqrt{2N\pi}\sin^{-1}G_z(n))\sqrt{1 - G_z(n)^2}. \tag{7}$$

The readout gradient amplitudes for the $n^{th}$ pulse sequence in this series is given by equations (5), (6) and (7). While n can be indexed from 1 to N in monotonic order during the scan, it can be appreciated that other orders are possible. As will be described below, the present invention enables the spherical k-space to be sampled with far fewer projection views, which results in a shorter scan time.

It should be apparent to those skilled in the art that sampling trajectories other than the preferred straight line trajectory extending from one point on the k-space peripheral boundary, through the center of k-space to an opposite point on the k-space peripheral boundary may also be used. As mentioned above, one variation is to acquire a partial NMR echo signal 203 which samples along a trajectory that does not extend across the entire extent of the sampled k-space volume. Another variation which is equivalent to the straight line projection reconstruction pulse sequence is to sample along a curved path rather than a straight line. Such pulse sequences are described, for example, in "Fast Three Dimensional Sodium Imaging", MRM, 37:706-715, 1997 by F. E. Boada, et al. and in "Rapid 3D PC-MRA Using Spiral Projection Imaging", Proc. Intl. Soc. Magn. Reson. Med. 13 (2005) by K. V. Koladia et al and "Spiral Projection Imaging: a new fast 3D trajectory", Proc. Intl. Soc. Mag. Reson. Med. 13 (2005) by J. G. Pipe and Koladia. It should also be apparent that the present invention may be employed with 3D as well as 2D versions of these sampling methods and use of the term "pixel" herein is intended to refer to a location in either a 2D or a 3D image.

The MRI system described above can be used in a wide variety of clinical applications to acquire either 2D or 3D sets of projection views that may be used to reconstruct one or more images. The image reconstruction method of the present invention is particularly useful in scans where one or more image frames are reconstructed using less than all the acquired projection views. In this application image artifacts that would ordinarily be produced due to undersampling are either eliminated or suppressed.

Figure 2A:
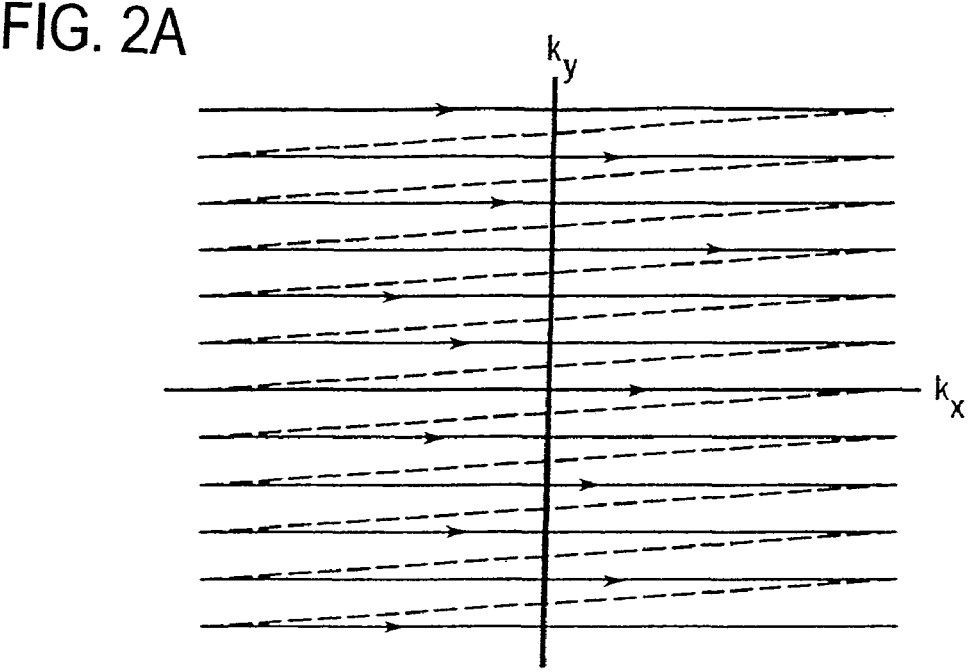
FIG. 2A is a graphic illustration of the manner in which k-space is sampled during a typical Fourier, or spin-warp, image acquisition using an MRI system.
Figure 2B:
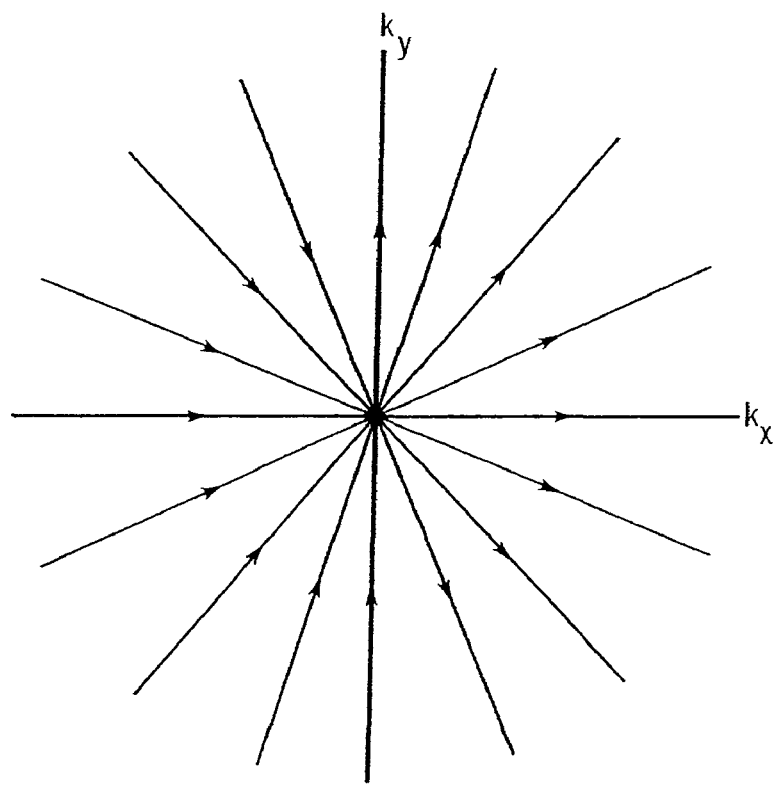
FIG. 2B is a graphic illustration of the manner in which k-space is sampled during a typical projection reconstruction image acquisition using an MRI system.
Figure 3:
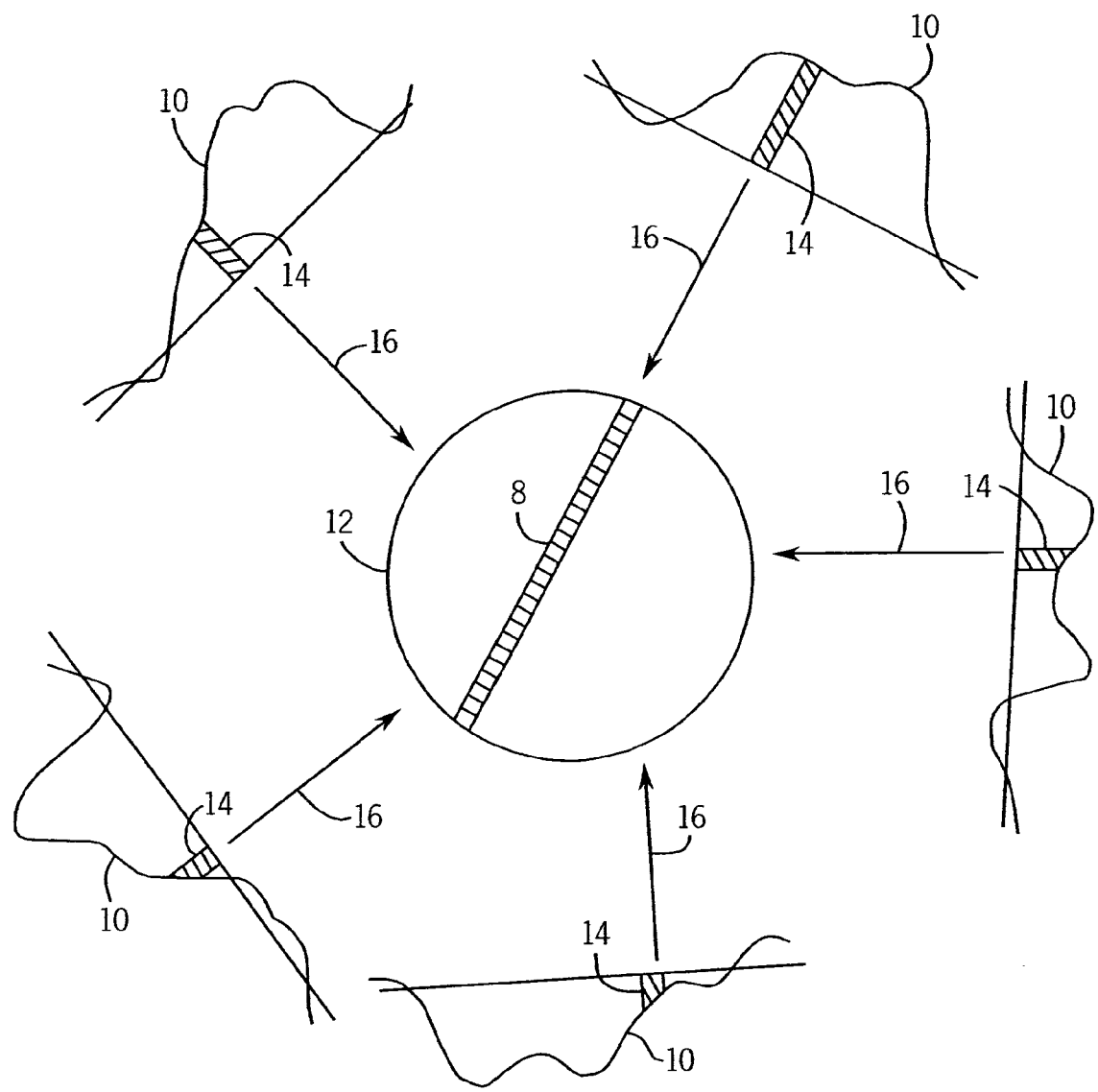
FIG. 3 is a pictorial representation of a conventional backprojection step in an image reconstruction process.
Figure 9:
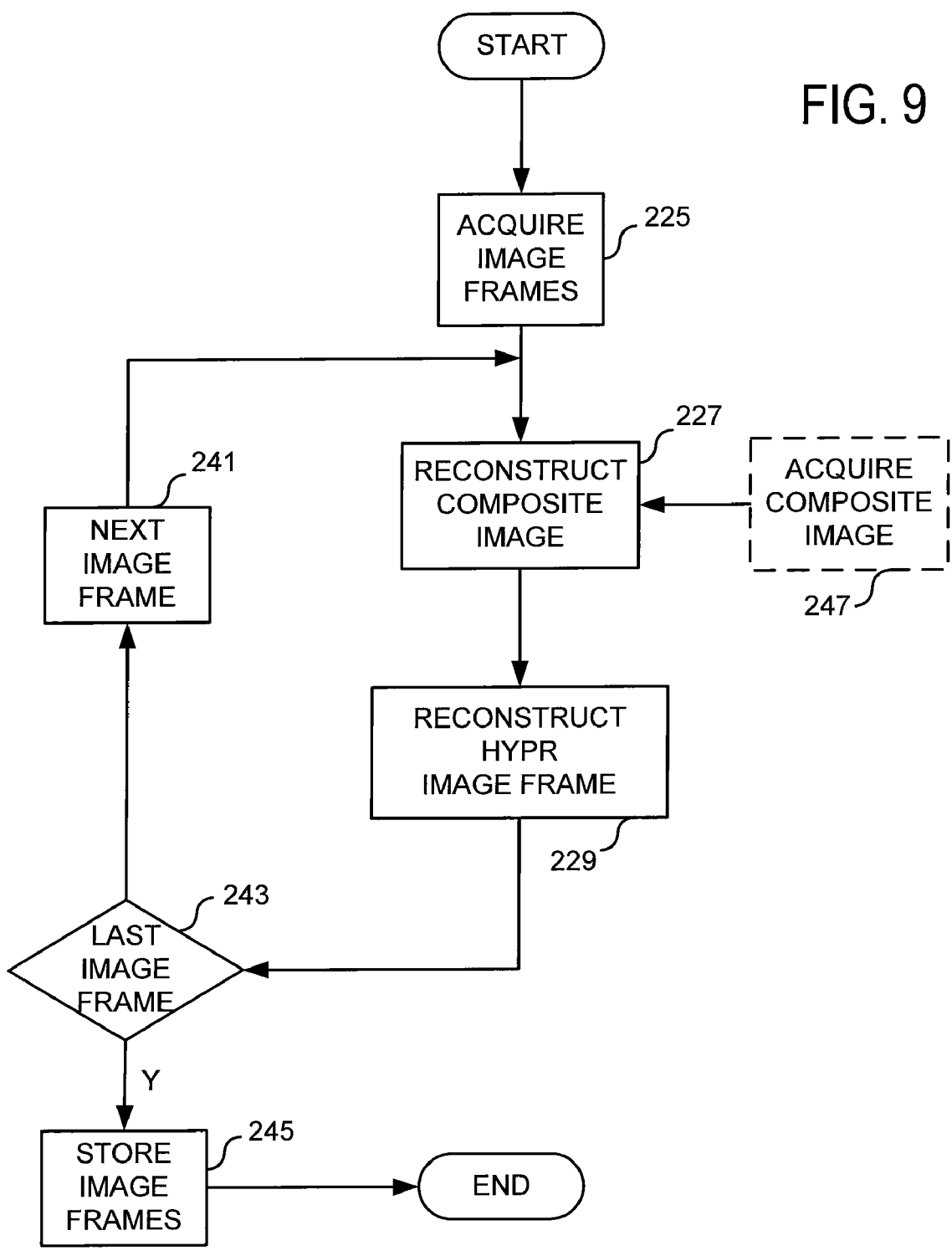
FIG. 9 is a flow chart of a preferred embodiment of the invention used in the MRI system of FIG. 6 with the pulse sequence of FIG. 7.

The first embodiment of the image reconstruction method directs the MRI system to acquire two-dimensional projection views and reconstruct a series of image frames that depict the subject over a period of time. Referring particularly to FIG. 9, sets of projection views are acquired from which a series of image frames are to be reconstructed as indicated at process block 225. The projection views in each set are few in number (e.g., 10 views) and evenly distributed to sample k-space as uniformly as possible as illustrated in FIG. 2. Because of the low number of projection views that are acquired, each image frame can be acquired in a very short scan time, but because k-space is highly undersampled, streak artifacts will occur in any image reconstructed using conventional methods.

The next step as indicated at process block 227 is to combine projection views that have been acquired from the subject of the examination and reconstruct a composite image. This will typically include projection views acquired in a time window surrounding acquisition of the current image frame and which are interleaved with the views for the current image frame. The composite image projections are much larger in number than the image frame data set and the composite image data set provides a more complete sampling of k-space. As a result, the reconstructed composite image has a higher signal-to-noise ratio (SNR) and streak artifacts are suppressed. In the preferred embodiment this reconstruction includes regridding the combined k-space projection data into Cartesian coordinates and then performing an inverse two-dimensional Fourier transformation (2 DFT) to produce the composite image.

As indicated at process block 229, the next step is to reconstruct a HYPR image frame in accordance with the localized method of the present invention. There are a number of different ways to accomplish this, which will be described in detail below with reference to FIGS. 10 and 11.

After the HYPR image frame has been reconstructed, a test is made at decision block 243 to determine if additional image frames are to be produced. If so, the system loops back through process block 241 to reconstruct another composite image as indicated at process block 277. In a dynamic study of a subject, for example, a series of image frames are acquired and reconstructed to depict how the subject changes over a period of time. The projection views acquired during the study are interleaved with each other so that they sample different parts of k-space and a composite image is formed by combining projection views that were acquired in a time window centered on the image frame being HYPR reconstructed. The width of this temporal window is set to include enough projection views to adequately sample k-space such that streak artifacts are suppressed and a high SNR is retained, but not to include so many projection views that the temporal resolution of the image frame is unduly reduced.

As indicated at process block 245, when the last image frame has been reconstructed as determined at decision block 243, the reconstructed image frames are stored. The stored image frames may be displayed one at a time or played out in sequence to show how the subject changes during the dynamic study.

It can be demonstrated that the SNR of each reconstructed image frame is dominated by the SNR of the composite image. SNR is calculated as the ratio of object signal level to the noise standard deviation within the object and CNR is calculated as the difference between the object and backgrounds signal levels divided by the standard deviation of the background noise. The overall SNR and CNR are limited by a combination of the stochastic noise and the noise due to the streak artifacts. It can be shown that the stochastic component of the SNR in the highly constrained backprojection reconstruction of the present invention is given by:

$$SNR_{HYPR} = SNR_{composite} / [1 + N_f/N_v^2 + N_{pix}/(N_p N_v^2)]^{1/2} \quad (3)$$

where $SNR_{composite}$ is the SNR in the composite image, $N_f$ is the number of image frames in the time series, $N_v$ is the number of object pixels in the projection, $N_{pix}$ is the number of pixels in the projection (e.g., 256 for 2D or 256×256 for 3D), and $N_p$ is the number of projections per image frame. If $N_p$ is on the order of 10 the SNR of the reconstructed HYPR image frame is dominated by $SNR_{composite}$.

The composite image may be acquired and reconstructed in a number of different ways depending on the clinical application. In the above embodiment of the invention the initial composite image is reconstructed from interleaved views acquired within a time window centered about the acquisition time of the image frame being reconstructed. This is particularly applicable to situations in which there is subject motion or substantial changes in the subject during the dynamic study. As indicated at process block 247 in FIG. 9, in other clinical applications the initial composite image may also be acquired during a separate scan that is not time constrained and in which k-space is fully sampled. This enables a high resolution, high SNR anatomical image of the subject to be acquired and used as the composite image.

Figure 10:
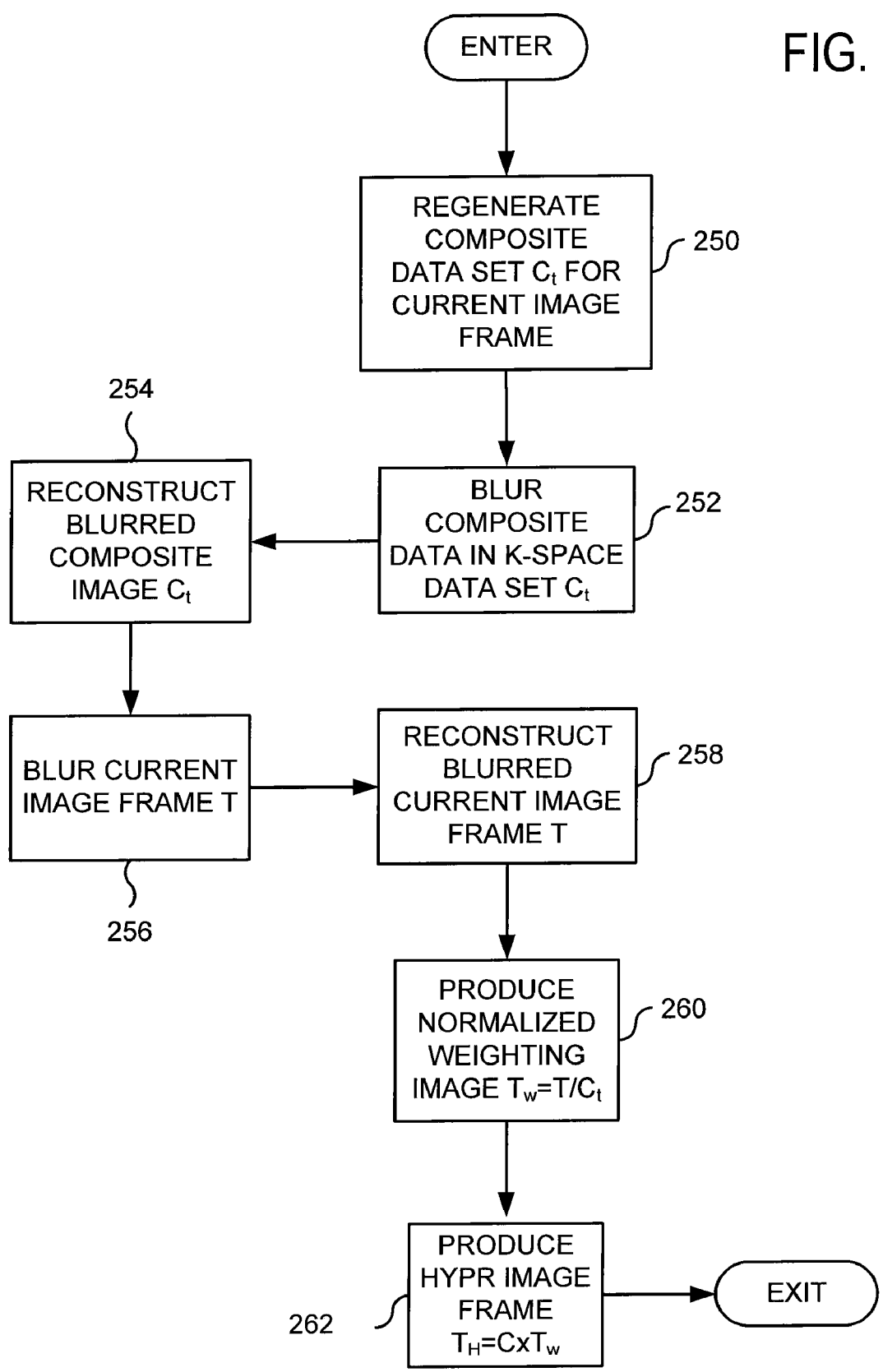
FIG. 10 is a flow chart of one preferred method for reconstructing a HYPR image frame that forms part of the method of FIG. 9.

Referring particularly to FIG. 10, the first step in reconstructing a HYPR image frame is to reproject a composite data set $C_t$ from the composite image for the current image frame, as indicated at process block 250. The current image frame is comprised of a few projection views acquired at selected view angles, and the reprojected composite data set $C_t$ is produced by reprojecting the composite image at these same view angles.

The next step as indicated at process block 252 is to blur the composite data set $C_t$. This is accomplished by Fourier transforming each projection view in the data set $C_t$ and then multiplying the resulting k-space projection by a Fourier transformed filter kernel described in more detail below.

As indicated at process block 254, a composite image $C_t$ is then reconstructed from the blurred data set $C_t$. This is a conventional image reconstruction such as regridding the radial k-space data to Cartesian coordinates followed by an inverse Fourier transformation. The resulting limited composite image $C_t$ will contain streak artifacts due to under sampling, however, these streak artifacts will be substantially the same as in the image frame to follow since the same view angles are contained in each.

As indicated by process block 256 the k-space projection views for the current image frame are also blurred with a Fourier transformed filter kernel. This is accomplished by multiplying each k-space projection view using the same filter described above for the composite data set $C_t$. A blurred current image frame T is then reconstructed using the filtered k-space data set as indicated at process block 258. As with the blurred composite image $C_t$, this is a standard image reconstruction and streaks will result from the undersampling.

As indicated at process block 260, a normalized weighting image $T_w$ is produced next by dividing the current blurred image frame T by the current blurred composite image $C_t$. This is a straight forward pixel-by-pixel division except pixels in the filtered composite image $C_t$ which are zero are first set to a small value. Phase information is preserved by separately performing this division operation on the real and imaginary components of the complex pixel value. As indicated at process block 262, the HYPR image frame $T_H$ is then produced by multiplying the complete composite image C by the normalized weighting image $T_w$. This is a straight forward pixel-by-pixel multiplication of corresponding pixels in the two images.

In this embodiment of the invention the normalized weighting image is "blurred" in k-space by the multiplication operations. In the second embodiment now to be described, this blurring is done in image space by a filtering operation. In either case the high SNR composite image is modified by the normalized weighting image $T_w$ to depict the subject at the time during the scan in which the current image frame data was acquired. The high SNR of the composite image is retained along with the time dependent information for the current image frame.

Figure 11:
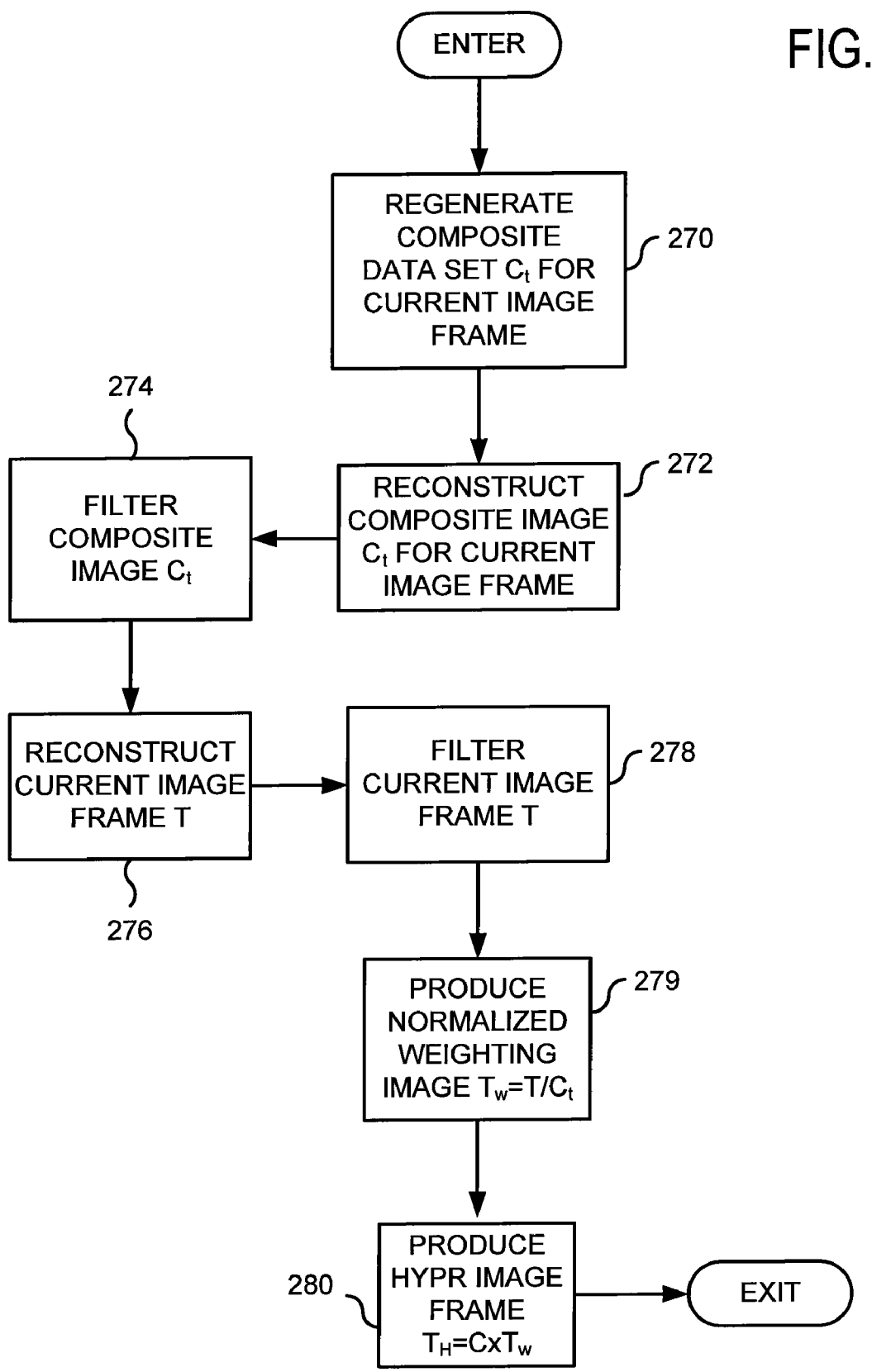
FIG. 11 is a flow chart of another preferred method for reconstructing a HYPR image frame.

Referring particularly to FIG. 11, in a second embodiment of the invention the "blurring" is performed in image space rather than k-space as described above. The first step in the second embodiment of the invention is to regenerate the composite data set $C_t$ for the current image frame as indicated at process block 270. This is the same step as described above at process block 250. As indicated at process block 272, a "limited" composite image is then reconstructed from the composite data set $C_t$ using a conventional image reconstruction method.

As indicated at process block 274, this limited composite image $C_t$ is then blurred by filtering. More specifically, the blurring is a convolution process in image space and the limited composite image $C_t$ is convolved with a filter kernel described in more detail below.

As indicated at process block 276, an image frame is reconstructed next from the limited projection views acquired for the current time point during the scan. This is a conventional image reconstruction, and as a result, streaks due to undersampling will appear in the resulting image frame T and it will have a relatively low SNR. The image frame is blurred by filtering it as indicated at process block 278. The filtering is performed in image space by the same convolution process described above for the limited composite image $C_t$ using the same filter kernel.

As indicated at process block 279, a normalized weighting image $T_w$ is produced next by dividing the filtered image frame T by the filtered composite image $C_t$. This is a conventional division of each pixel value in the filtered image frame T by the corresponding pixel value in the filtered composite image $C_t$. This normalized weighting image $T_w$ is then multiplied by the complete composite image C, as indicated at process block 280, to produce the final HYPR image frame $T_H$.

In the first two embodiments described above a filter kernel or its Fourier transformation is used to blur images in image space or k-space. In the preferred embodiments a 7×7 square filter kernel is used in image space to blur two-dimensional images and its Fourier transformed sinc function is used to blur k-space image data. When reconstructing a 3D image a cubical 9×9×9 filter kernel or a spherical kernel with equal weighting throughout the kernel is used in image space and its Fourier transform is used to blur in k-space. The kernel size should be selected so that when the blurring is done the kernel does not include much information from outside the subject of interest (for example, a blood vessel). The kernel size should be on the order of the dimension of the objects being examined or somewhat smaller but its exact shape is not crucial. Gaussian or other smooth kernels may also be used and the resulting function being performed is a low pass filtering.

In the first two embodiments the filtering is performed separately on the limited composite data or image $C_t$ and on the current image frame data or image. It is also possible to first perform the division operation in k-space or image space and then perform the blurring function on the result in either k-space (multiplication) or image space (convolution). Any streaks that occur after the divisional operation are blurred when this embodiment is employed.

In the above embodiments of the invention a blurring, or filtering, operation is performed on the k-space data or image space data. An equivalent, but less desirable method for achieving the same result is to divide the image space field of view into smaller segments and separately reconstruct each smaller segment using the HYPR method. The segments are then combined to form the complete reconstructed image. As indicated above, this method is equivalent to the blurring methods described above because the result is theoretically the same if the segment size is reduced to one pixel. A preferred embodiment of this equivalent "segmented" HYPR method will now be described.

Figure 13:
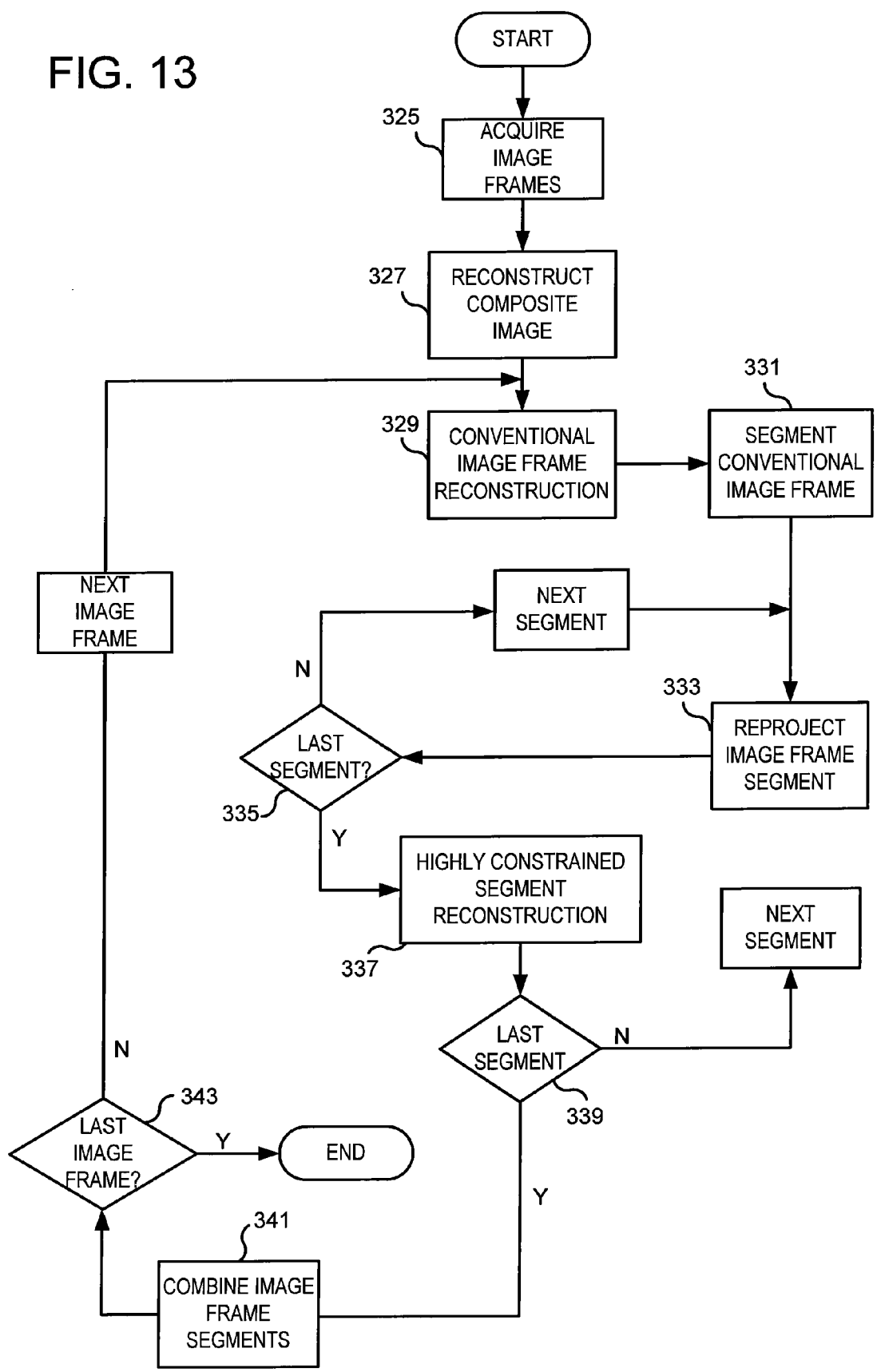
FIG. 13 is a flow chart of a preferred embodiment of the invention used in the MRI system of FIG. 6.

Referring particularly to FIG. 13, either of the above pulse sequences may be used to acquire a series of image frames as indicated at process block 325. For example, these image frames may be acquired as part of a CEMRA dynamic study in which the series of image frames is acquired from vasculature as a bolus of contrast agent enters the field of view. Each image frame is highly undersampled in order to increase the temporal resolution of the study and the projection views acquired for each undersampled image frame are interleaved with the projection views acquired for the other image frames.

As shown at process block 327, the next step is to reconstruct a high quality composite image for use in the highly constrained reconstruction process. In this embodiment the composite image is produced by combining all the interleaved projection views from the acquired image frames into a single, highly sampled k-space data set, and performing a conventional image reconstruction using the combined k-space data set. The conventional reconstruction may be a Fourier transformation of each projection view followed by a filtered backprojection, or it may be a regridding of the k-space samples in the combined k-space data set into Cartesian coordinates followed by three-dimensional Fourier transformation. In the alternative, a separate composite image may be acquired and reconstructed.

Referring still to FIG. 13, a loop is entered next in which an image frame is reconstructed. A single image frame may be reconstructed, but typically the image frame reconstruction loop is repeated many times to reconstruct all image frames acquired during the dynamic study.

Figure 15:
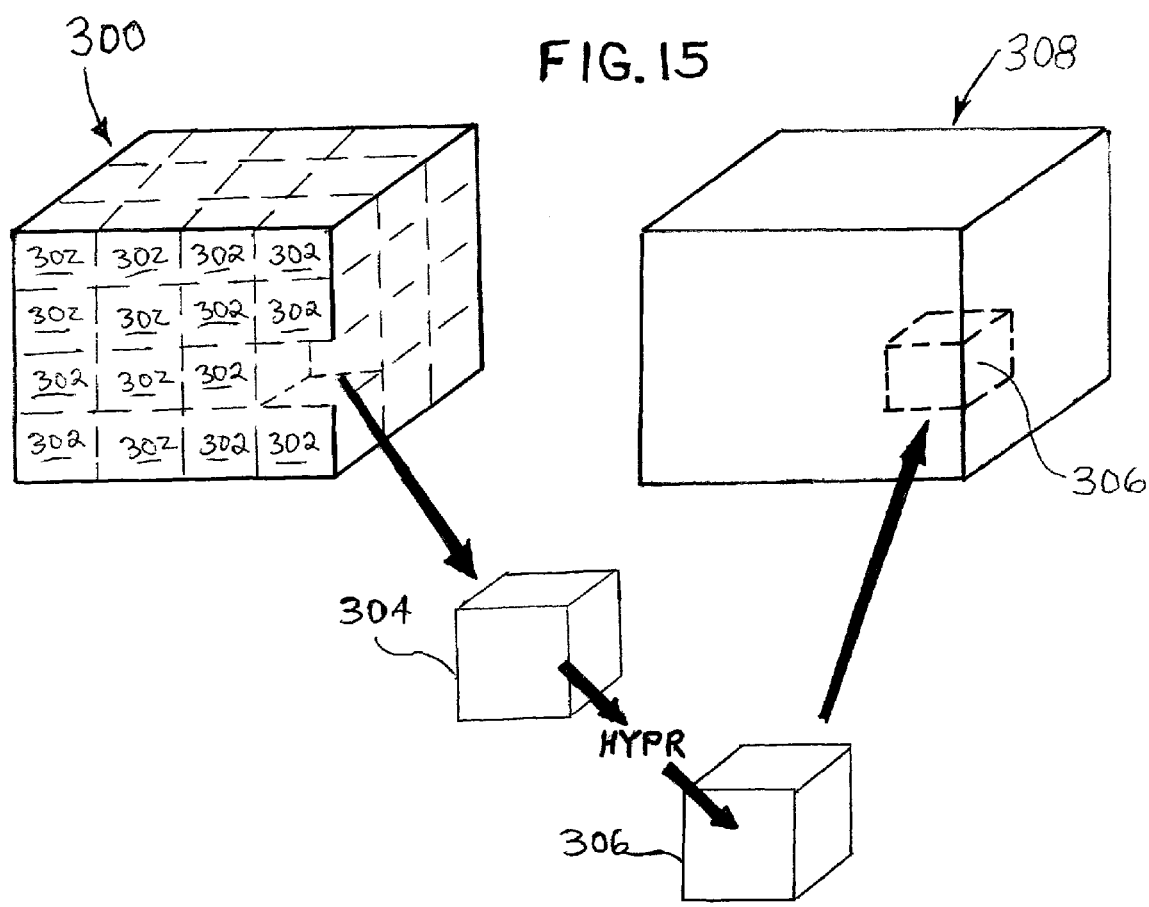
FIG. 15 is a pictorial representation of the process depicted in FIG. 13.

The first step in this loop as indicated at process block 329 is to reconstruct an image using the acquired highly undersampled image frame. This is a conventional image reconstruction, and since the acquired image frame is highly undersampled, the resulting image may contain many streaks and other artifacts that limit its diagnostic value. The next step as indicated at process block 331 is to segment this conventional image frame. As illustrated in FIG. 15, segmentation in this invention means dividing up the 3D FOV 300 into smaller 3D volumes, or segments 302.

After the conventional image frame is segmented a loop is entered in which each smaller segment 302 is reprojected into Radon space. As indicated at process block 333 all the pixels in the 3D FOV 300 are set to zero except those in the segment 302 being reprojected. The segment is then reprojected in a conventional manner to form a set of projection views indicated at data block 304 in FIG. 15. It is preferable to reproject along as many different view angles as is practical from a processing time standpoint. This reprojection process continues until all the separate segments 302 of the image frame have been reprojected as indicated at decision block 335 to produce corresponding projection view data blocks 304.

A loop is then entered in which each of the reprojected segment data sets 304 are reconstructed into final image segments 306 using a highly constrained image reconstruction method (HYPR) as indicated at process block 337 and shown pictorially in FIG. 15. This is the method described in the above-cited copending U.S. application Ser. No. 11/482,372 which will be described in more detail below with respect to FIG. 14. The important point to note is that in this case the image frame segment projection data set 304 is very sparse because all of the signal to be reprojected is from only one small segment 302 of the acquired FOV. When the last image frame segment 302 has been backprojected as indicated at decision block 339, all of the smaller reconstructed final segment images 306 are combined to form a single 3D image frame 308 as indicated at process block 341 and shown pictorially in FIG. 15. This is nothing more than placing each final segment image 306 in its proper location in the 3D FOV 308.

Each image frame acquired during the study may be reconstructed in this manner. The process terminates as indicated at decision block 343 when the last image frame has been reconstructed.

A possible variation of the above method is to separately store each final image segment 306 for each reconstructed image frame. This enables selected segments 306 to be displayed separately in situations where the diagnosis focuses on a small portion of the image frame FOV 308. This is particularly useful, for example, when MIP images are produced and other vessels may overlap and obscure vessels of particular interest in one image segment 306.

Figure 4:
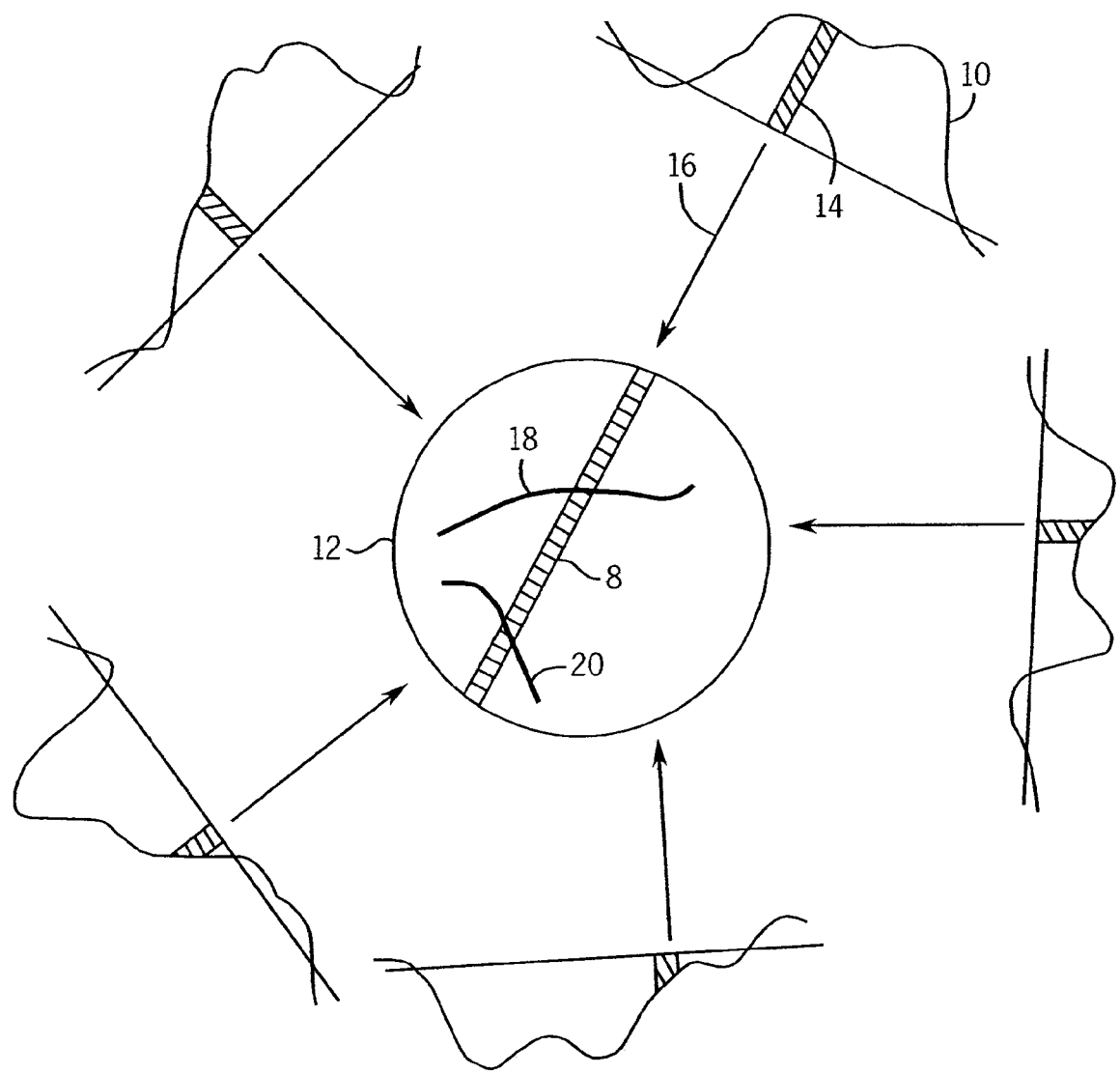
FIG. 4 is a pictorial representation of the highly constrained 2D backprojection step according to the present invention.
Figure 5:
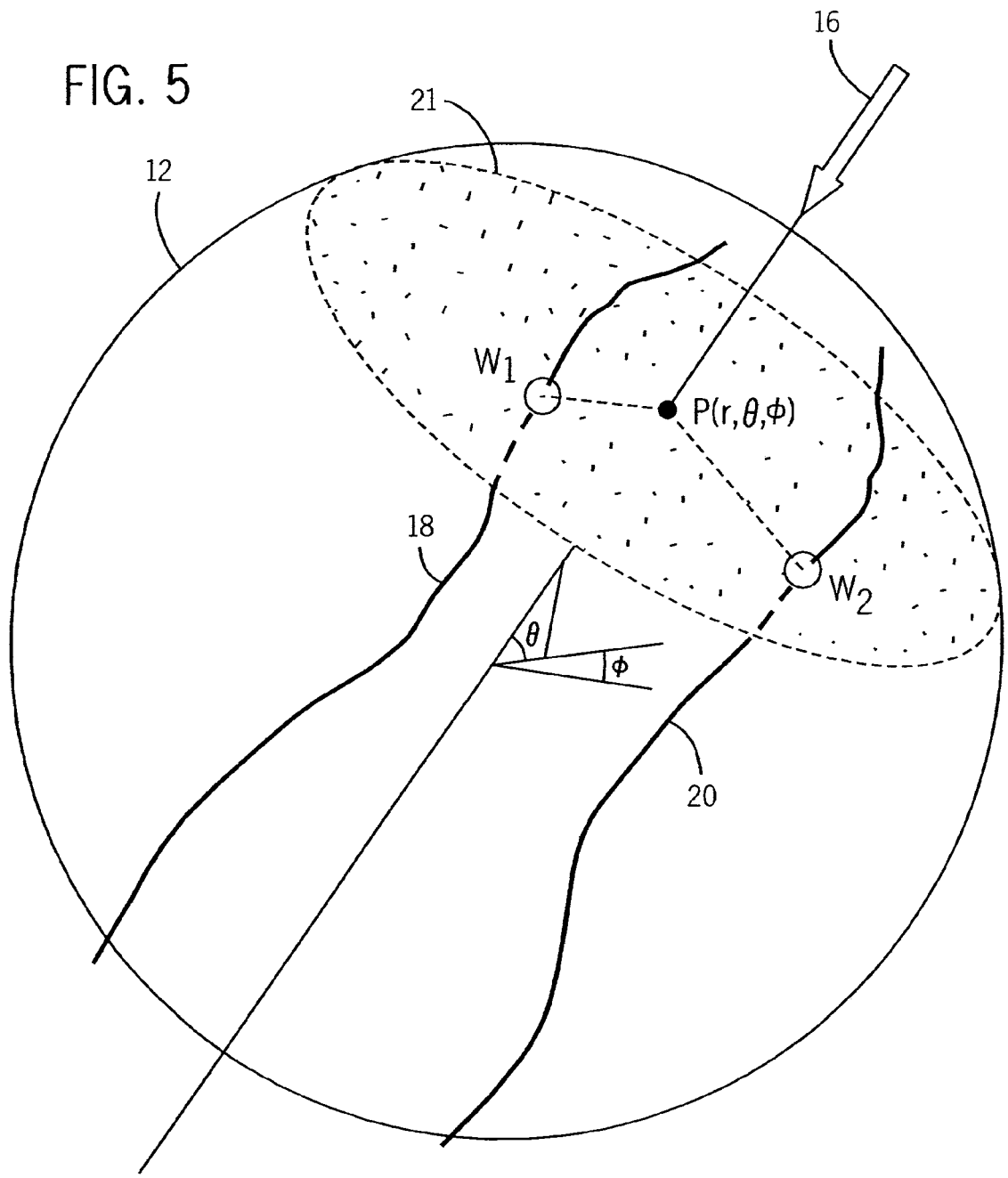
FIG. 5 is a pictorial representation of the highly constrained 3D backprojection according to the present invention.
Figure 14:
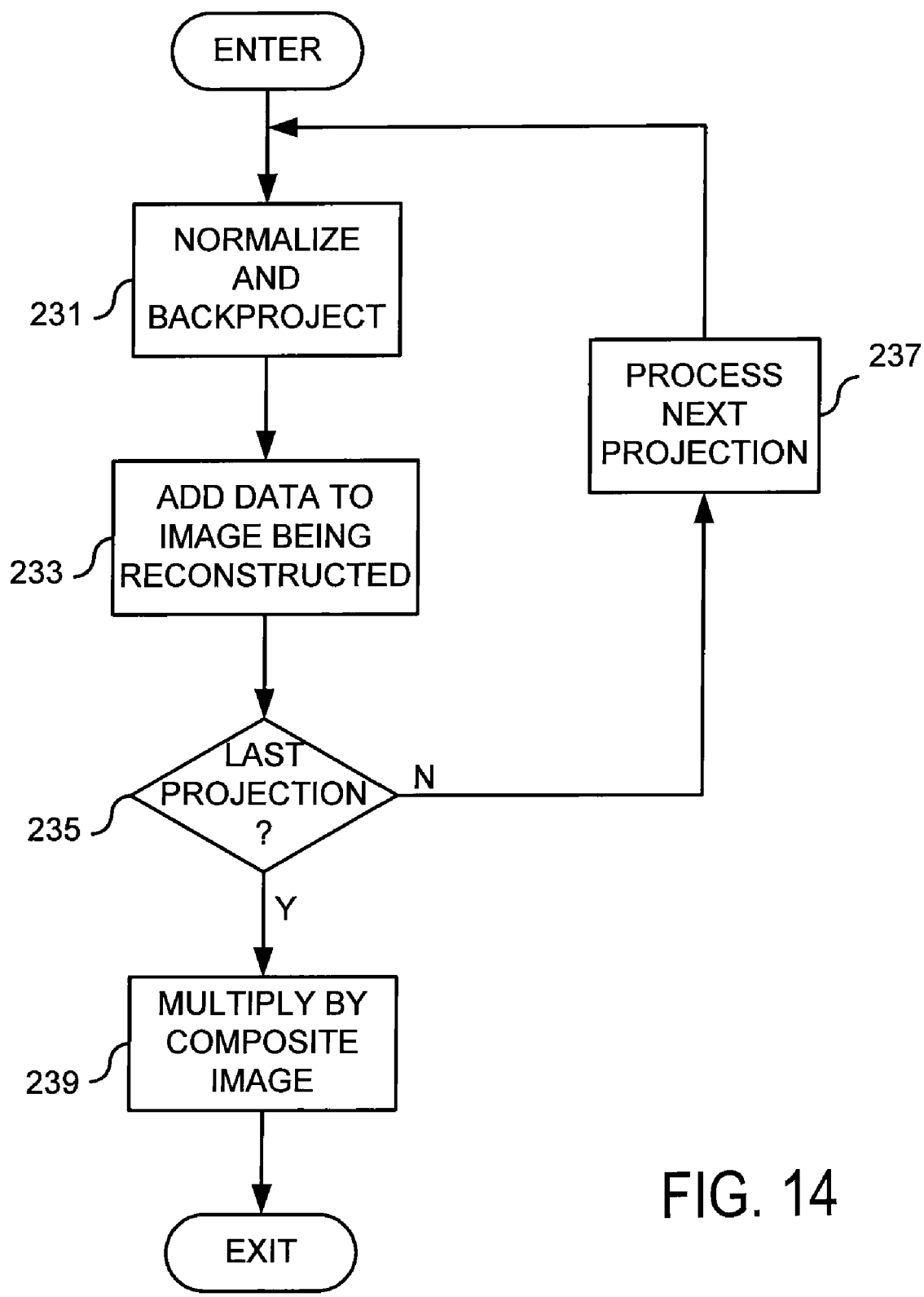
FIG. 14 is a flow chart of the highly constrained image reconstruction method used in the method of FIG. 13.

Referring particularly to FIG. 14, the highly constrained reconstruction of each image frame segment 306 in the above method is described above with respect to equation (2) and shown pictorially in FIG. 4. More particularly, image frame segment 304 projection P is normalized as indicated at process block 231. Each projection P is normalized by dividing it by the projection $P_c$ in the composite image at the same view angle. The normalized projection $P/P_c$ is then backprojected into the FOV. This is a standard backprojection, but with no filtering.

As indicated at process block 233 the resulting backprojected values are added to the image frame segment 306 being reconstructed and a test is made at decision block 235 to determine if all the projection views for the current image frame segment 304 have been backprojected. If not, the next projection view in the current image frame segment 304 is backprojected as indicated at process block 237.

When all the projection views have been backprojected and summed for an image frame segment 304, the summed image frame segment is multiplied by the composite image as indicated at process block 239 to form the final image frame segment 306. This is a matrix multiplication in which the pixel value in the image frame segment is multiplied by the value of the corresponding pixel in the composite image. It should be apparent that other methods for performing this highly constrained image frame segment reconstruction may be used as described in co-pending U.S. patent application Ser. No. 11/482,372, filed on Jul. 7, 2006 and entitled "Highly Constrained Image Reconstruction Method", which is incorporated herein by reference.

While the invention has been described in the context of a 2D or 3D mage reconstruction of k-space projection views acquired with an MRI system, it should be apparent to those skilled in the art that the invention is applicable as well to other medical imaging systems that acquire Radon space data such as x-ray CT, PET and SPECT imaging systems. Also, the invention is not limited to k-space data acquired as radial projections, but is also applicable to other k-space sampling trajectories. For example, images acquired using interleaved spiral trajectories or Cartesian trajectories can be regridded and subjected to the same operations described above.

All of the above-described embodiments of the invention can fairly be characterized as image reconstruction methods in which a limited set of views of a subject are acquired with a medical imaging system and an image is produced from these views. The present invention is not limited to image reconstruction, but can also be applied to improve the quality of existing images. More specifically, the higher SNR of an available composite image may be imbued to an available, lower quality image frame by employing the highly constrained image processing of the present invention. The image frames may have already been acquired and reconstructed and the available higher quality composite image may be produced by combining the image frames, or by acquiring a higher quality image with the same imaging system, or by acquiring a higher quality image with a different imaging system of the same or different modality.

Figure 1:
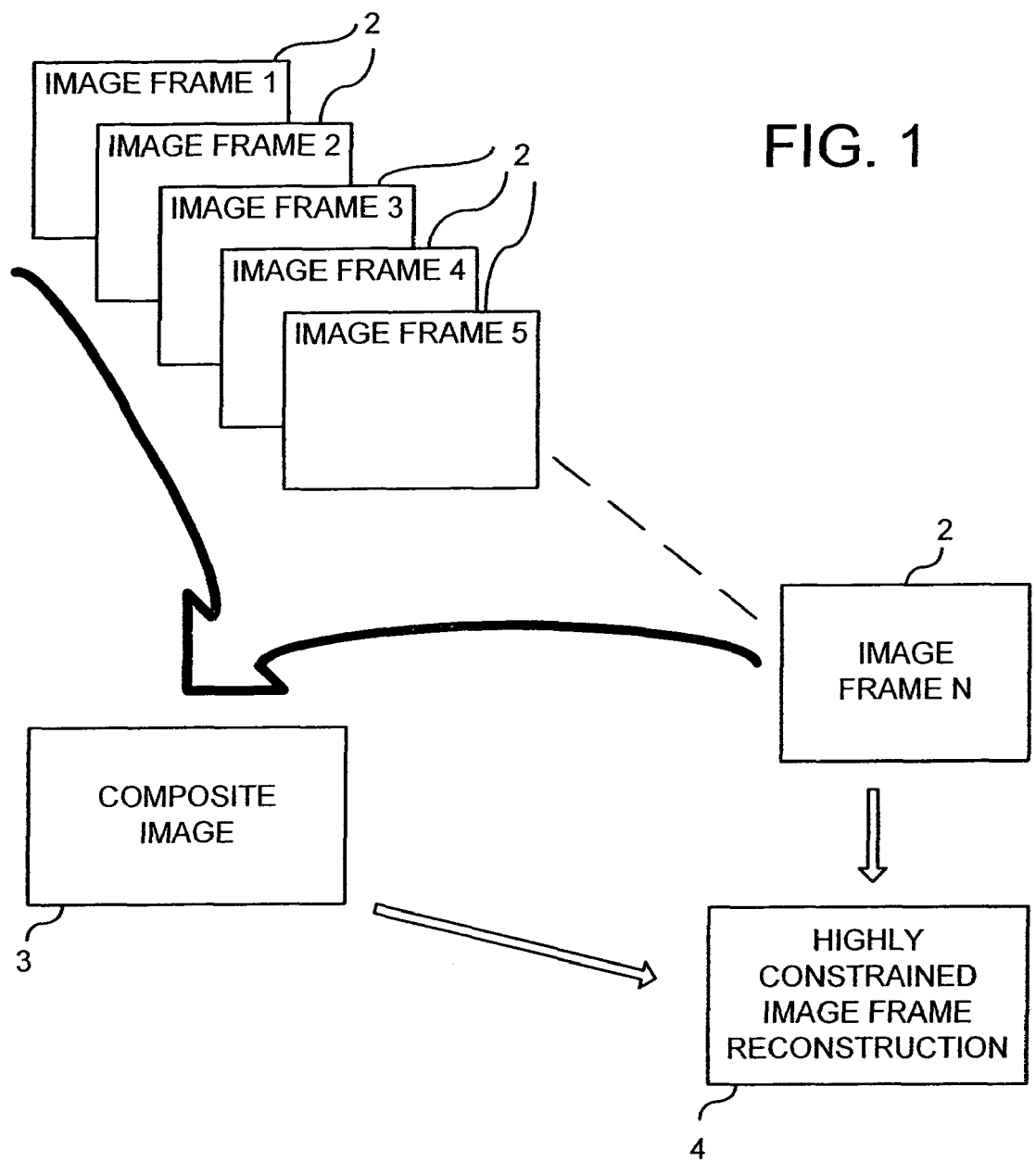
FIG. 1 is a pictorial view illustrating the application of the present invention to medical imaging applications.
Figure 16:
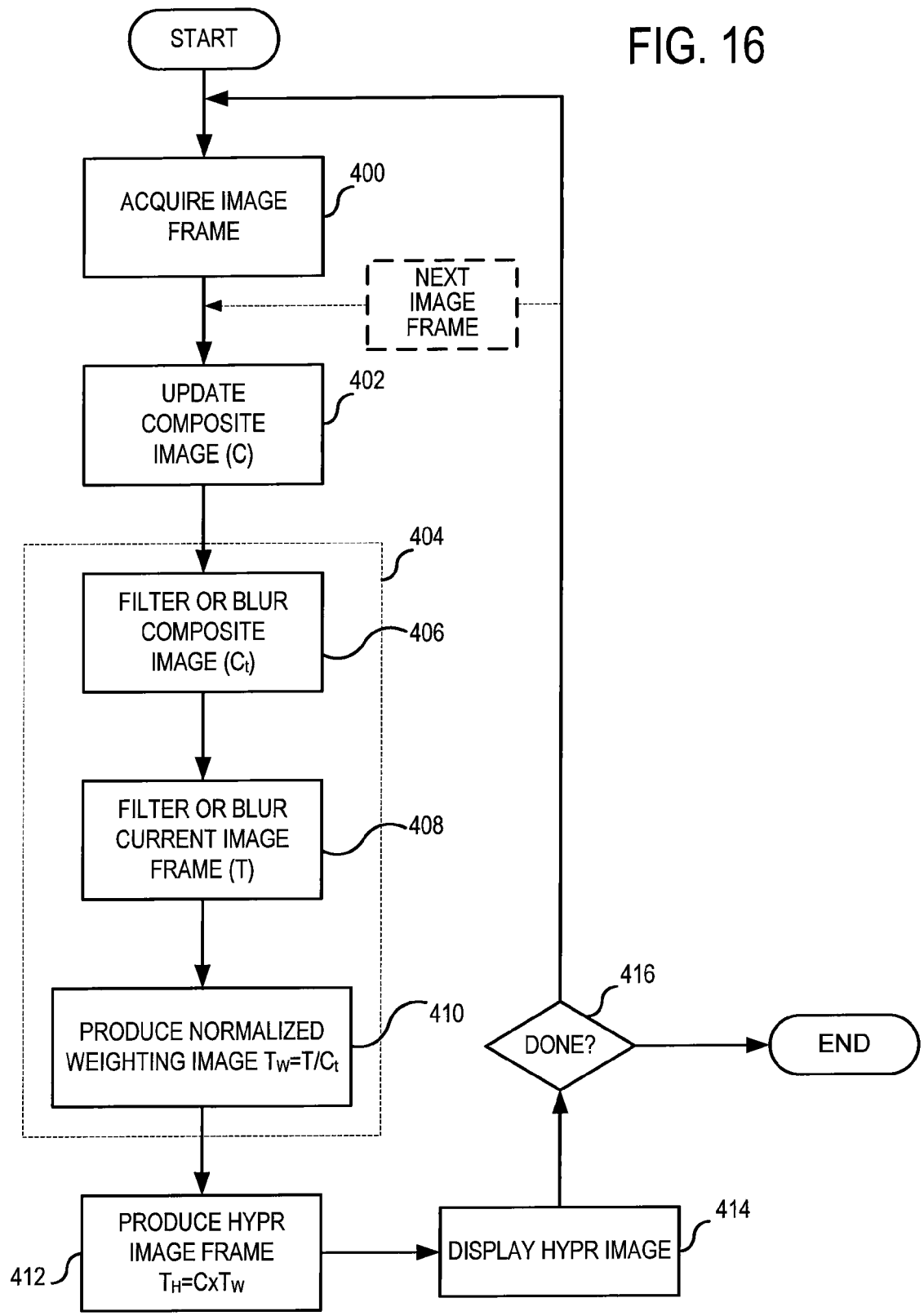
FIG. 16 is a flow chart of another preferred embodiment of the invention.

Referring particularly to FIGS. 1 and 16, the highly constrained image processing is performed on a series of image frames 2. As each image frame 2 is acquired as indicated at process block 400, it is stored and a copy is used to update a composite image 3 as indicated at process block 402. The composite image 3 is an accumulation of the current image frame 2 with a preselected number of other acquired image frames 2. The accumulation is the matrix addition of corresponding pixels in the 2D image frames 2 divided by the number of image frames contributing to the accumulation. The result is a composite image 3 that has an increased SNR that is directly proportional to the preselected number of accumulated image frames 2. For example, if 36 2D image frames 2 are accumulated, the SNR will be 6 times the SNR of a single 2D image frame 2. The number of image frames 2 used to form the composite image will depend on the particular clinical procedure being performed.

As indicated generally at 404, the next step is to produce a normalized weighting image using the current 2D image frame 2 and the updated composite image 3. There are a number of different ways to perform this step and the preferred method is shown in FIG. 16. More specifically, the updated composite image 3 is "blurred" by filtering as indicated at process block 406. The filtering is a convolution process in which the updated 2D composite image array 3 is convolved with a filter kernel as described above. The kernel size should be selected so that when the blurring is done the kernel does not include much information from outside the subject of interest (for example a blood vessel). If the filter kernel is much larger than the subject of interest, the magnitude of the signal therein may be averaged, but its shape is not changed. On the other hand, if the filter kernel is smaller than the subject of interest, its shape, or profile, may be blurred.

Referring still to FIG. 16, the current 2D image frame 2 is also blurred or filtered in the same manner as indicated at process block 408. That is, the 2D image frame array 2 is convolved with the filter kernel to perform a low pass filtering function. As indicated at process block 410, the normalized weighting image ($T_W$) is then produced by dividing pixel values in the filtered current image frame (T) by the corresponding pixel values in the filtered composite image ($C_t$).

As indicated at process block 412, a highly constrained (HYPR) image frame 4 is then produced. This image frame 4 is produced by multiplying the updated composite image array 3 by the normalized weighting image array ($T_W$). This is a multiplication of corresponding pixel values in the two images. The resulting 2D HYPR image 4 is then output to a display as indicated at process block 414 and the system loops back to acquire and process the next 2D image frame 2. When the procedure is completed, as determined at decision block 416, the program ends.

Figure 17:
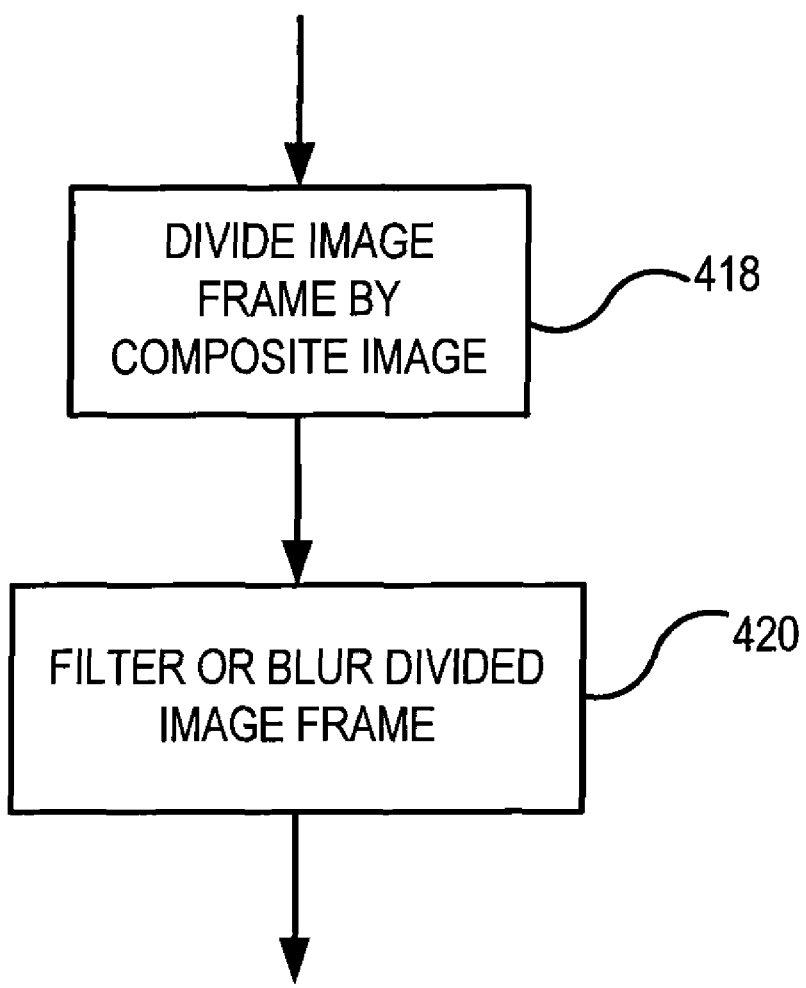
FIG. 17 is a flow chart of the alternative method for use in the procedure of FIG. 16.
Figure 18:
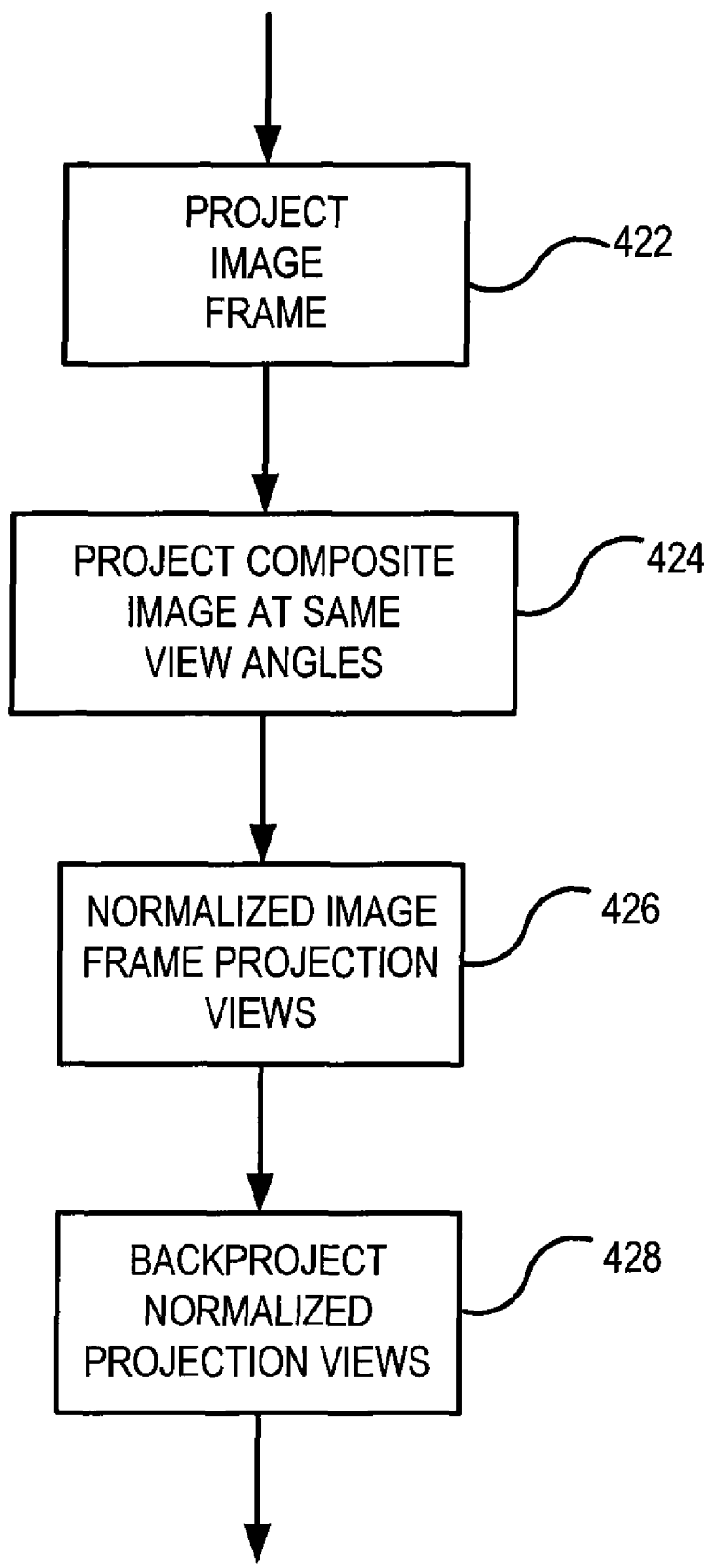
FIG. 18 is a flow chart of another alternative method for use in the procedure of FIG. 16.
Figure 19:
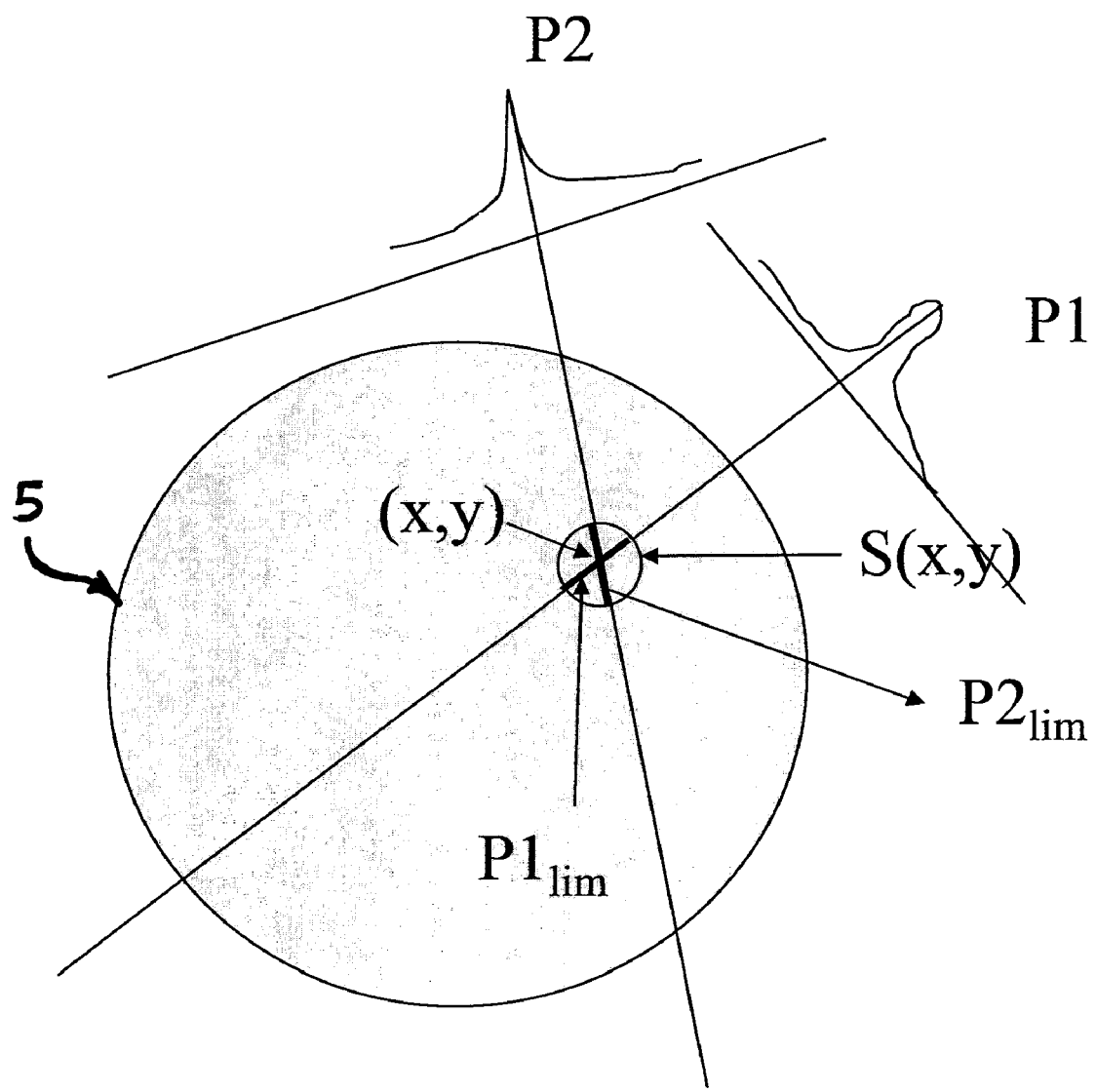
FIG. 19 is a pictorial representation of the HYPR reconstruction of a segment of the field of view which forms part of the present invention.

As indicated above, there are a number of alternative methods for producing the normalized weighting image ($W_T$). Two of these methods are illustrated in FIGS. 17 and 18. Referring particularly to FIG. 17, the first alternative method includes a first step indicated at process block 418 of dividing the acquired 2D image frame array 2 by the updated composite image 3. This is a division of every pixel value in the acquired image frame array 2 by the corresponding pixel value in the updated composite image array 3. The resulting 2D divided image frame is then blurred or filtered as indicated at process block 420 to produce the normalized weighting image ($T_W$). This filtering operation is the same convolution process discussed above with respect to process blocks 406 and 408.

Another alternative method for producing the normalized weighting image ($T_W$) is illustrated in FIG. 18. This method transforms the acquired 2D image frame 2 to Radon space by taking projection views of the image from different view angles as indicated at process block 422. As indicated at process block 424, the updated composite image 3 is also transformed to Radon space by calculating projection views at the same set of view angles used to transform the 2D image frame 2. As indicated at process block 426 the image frame projection views P are then normalized by dividing them by the composite image projection views $P_C$. This is a division of corresponding elements in the projections P and $P_C$ at the same view angle. The normalized weighting image ($T_W$) is then produced at process block 428 by back projecting the normalized projections ($P/P_C$) in a conventional manner. This is not a filtered backprojection, but a straight forward backprojection.

The invention claimed is:

1. A method for producing an image of a subject positioned in a field of view (FOV) of a medical imaging system, the steps comprising:
    a) acquiring with the medical imaging system a plurality of views of the subject positioned in the FOV;
    b) producing an image frame data set from selected views acquired in step a);
    c) producing a composite image from views acquired in step a) wherein the views combined to produce the composite image includes the views in the image frame data set and additional acquired views;
    d) reconstructing a normalized weighting image of the subject, which comprises:
        d)i) producing a limited composite data set from the composite image which contains views corresponding to the selected views in the image frame data set;
        d)ii) blurring the image frame data set with a filter function;
        d)iii) blurring the limited composite data set with a filter function;
        d)iv) calculating the normalized weighting image by dividing the blurred image frame data set by the blurred limited composite data set; and
    e) producing a highly constrained image of the subject in the FOV by multiplying pixel values in the normalized weighting image by the corresponding pixel values in the composite image.

2. The method as recited in claim 1 in which the views acquired in step a) are projection views acquired at interleaved projection angles, the image frame data set produced in step b) includes producing the image data set from a selected set of said projection views, and the limited composite data set produced in d)i) is formed by reprojecting the composite image produced in step c) at the projection angles corresponding to the selected set of projection views.

3. The method as recited in claim 1 which includes:
    f) producing additional images of the subject by repeating step d) using different ones of the views acquired in step a).

4. The method as recited in claim 1 in which the blurring operations in steps d)ii) and d)iii) are performed by multiplying the data sets by a transformed filter kernel.

5. The method as recited in claim 1 in which the views acquired in step a) are acquired over a period of time during which changes occur in the subject; step b) includes selecting a set of views acquired during a time interval in the performance of step a); and step c) includes selecting a set of views acquired during a window of time that includes said time interval and is longer than said time interval.

6. The method as recited in claim 1 in which the medical imaging system is a magnetic resonance imaging system and each view samples a line in k-space.

7. The method as recited in claim 1 in which step d)iv) is performed by reconstructing a filtered image frame from the filtered image frame data set, reconstructing a filtered limited composite image from the filtered limited composite data set, and then dividing pixel values in the filtered image frame by corresponding pixel values in the filtered limited composite image.

8. The method as recited in claim 1 in which step d)iv) is performed by dividing the blurred image frame data set by the blurred limited composite data set and transforming the result to image space.

9. The method as recited in claim 1 in which the blurring operations in steps d)ii and d)iii) are performed by transforming the data sets to image space and convolving the transformed data sets with a filter kernel.

10. A method for producing an image of a subject, the steps comprising:
    a) acquiring with a medical imaging system a composite image of the subject having a relatively high quality;
    b) acquiring with one of the medical imaging system and another medical imaging system an image frame having a relatively low quality; and;
    c) producing a higher quality image frame by:
        c)i) producing a normalized weighting image using the image frame and the composite image; and
        c)ii) multiplying the normalized weighting image by the composite image.

11. The method as recited in claim 10 in which step c)i) includes blurring the image frame and the composite image and dividing the blurred image frame by the blurred composite image.

12. The method as recited in claim 11 in which the blurring is performed by convolving each image with a filter kernel.

13. A highly constrained reconstruction of an acquired image frame data set the steps comprising:
    reconstructing a conventional image frame from the acquired image frame data set;
    separating the conventional image frame into a plurality of segments;
    reprojecting each image frame segment to form a corresponding plurality of segment projection view data sets; and reconstructing final image frame segments using the corresponding segment projection view data sets in a back-projection process that is highly constrained by a composite image containing a priori information about the subject being imaged.

14. The method as recited in claim 13 in which the final image frame segments are combined to form a final image frame.

15. The method as recited in claim 13 in which a final image segment is selectively displayed.

16. The method as recited in claim 13 in which the composite image is reconstructed using the acquired image frame data set combined with other acquired image data.

* * * * *